United States Patent
Orazem et al.

(10) Patent No.: US 10,315,165 B2
(45) Date of Patent: Jun. 11, 2019

(54) CONTINUOUS ELECTROKINETIC DEWATERING OF PHOSPHATIC CLAY SUSPENSIONS

(71) Applicant: University of Florida Research Foundation, Inc., Gainesville, FL (US)

(72) Inventors: Mark E. Orazem, Gainesville, FL (US); Rui Kong, Gainesville, FL (US); Saeed Moghaddam, Gainesville, FL (US); Yuelong Huang, Gainesville, FL (US); Dazhi Yu, Gainesville, FL (US); Han Lai, Gainesville, FL (US); David A. Horner, Gainesville, FL (US); David Bloomquist, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 68 days.

(21) Appl. No.: 15/516,989

(22) PCT Filed: Oct. 5, 2015

(86) PCT No.: PCT/US2015/053998
§ 371 (c)(1),
(2) Date: Apr. 5, 2017

(87) PCT Pub. No.: WO2016/057392
PCT Pub. Date: Apr. 14, 2016

(65) Prior Publication Data
US 2017/0320018 A1  Nov. 9, 2017

Related U.S. Application Data

(60) Provisional application No. 62/059,930, filed on Oct. 5, 2014, provisional application No. 62/143,303, filed on Apr. 6, 2015.

(51) Int. Cl.
| | | |
|---|---|---|
| *B01D 61/56* | (2006.01) | |
| *C02F 11/00* | (2006.01) | |
| *C02F 11/12* | (2019.01) | |
| *C02F 101/10* | (2006.01) | |

(52) U.S. Cl.
CPC ............ *B01D 61/56* (2013.01); *C02F 11/006* (2013.01); *C02F 11/12* (2013.01); *C02F 2101/105* (2013.01)

(58) Field of Classification Search
CPC ........ B01D 61/56; C02F 11/006; C02F 11/12; C02F 2101/105
See application file for complete search history.

(56) References Cited

U.S. PATENT DOCUMENTS

| | | |
|---|---|---|
| 3,664,940 A | 5/1972 | Greyson |
| 3,962,069 A | 6/1976 | Inoue et al. |

(Continued)

FOREIGN PATENT DOCUMENTS

| | | |
|---|---|---|
| CA | 840993 | 5/1970 |
| CN | 101311133 | 11/2008 |

(Continued)

OTHER PUBLICATIONS

Supplementary European Search Report for EP 13 84 3136 dated Jun. 7, 2016.

(Continued)

*Primary Examiner* — Arun S Phasge
(74) *Attorney, Agent, or Firm* — Thomas Horstemeyer, LLP

(57) ABSTRACT

Various methods and systems are provided for electrokinetic dewatering of suspensions such as, e.g., phosphatic clay. In one example, among others, a system for continuous dewatering includes a cake formation zone including a first anode and a first cathode each extending across a first portion of a separation chamber; a cake dewatering zone including a (Continued)

second anode and a second cathode; an inlet configured to supply a dilute feed suspension comprising solids suspended in water to the cake formation zone; and a conveying belt extending between the first anode and the first cathode and between the second anode and the second cathode. A first electric field between the first anode and the first cathode forms a cake on the conveying belt by consolidating the solids, and a second electric field between the second anode and the second cathode dewaters the cake on the conveying belt.

17 Claims, 23 Drawing Sheets

(56) References Cited

U.S. PATENT DOCUMENTS

| | | | |
|---|---|---|---|
| 4,107,026 A | 8/1978 | Freeman | |
| 4,244,804 A | 1/1981 | Moeglich | |
| 4,671,874 A | 6/1987 | Fremont et al. | |
| 4,755,305 A | 7/1988 | Fremont et al. | |
| 4,808,304 A * | 2/1989 | Deal | B01D 21/0009 204/649 |
| 5,378,334 A | 1/1995 | Dadoo et al. | |
| 5,435,893 A | 7/1995 | Sun et al. | |
| 2008/0271999 A1 | 11/2008 | Jones et al. | |
| 2009/0159426 A1 | 6/2009 | Chen | |

FOREIGN PATENT DOCUMENTS

| | | |
|---|---|---|
| EP | 0582314 | 11/1996 |
| FR | 1516158 | 3/1968 |
| GB | 1170413 | 11/1969 |
| WO | 2005058463 | 6/2005 |
| WO | 2014055723 A1 | 4/2014 |

OTHER PUBLICATIONS

International Search Report for PCT/US2015/053998 dated Dec. 22, 2015.

* cited by examiner

| $E$ | $w_f$/wt% | $T_w$/NTU | $\tau$/h | $P_{req}$/MW | $E_{req}$ | Electricity Cost[d] |
|---|---|---|---|---|---|---|
| 1 V/cm[a] | 35 | 9.1 | 3.0 | 29 | 47 Wh/kg$_{solids}$ | $2.9/10$^3$kg$_{solids}$ |
| | | | | | 6.6 Wh/kg$_{H_2O}$ | $0.41/10$^3$kg$_{H_2O}$ |
| 2 V/cm[a] | 35 | 4.2 | 2.0 | 43 | 70 Wh/kg$_{solids}$ | $4.3/10$^3$kg$_{solids}$ |
| | | | | | 9.7 Wh/kg$_{H_2O}$ | $0.60/10$^3$kg$_{H_2O}$ |
| 4 V/cm[a] | 31 | 3.5 | 2.4 | 269 | 434 Wh/kg$_{solids}$ | $27/10$^3$kg$_{solids}$ |
| | | | | | 103 Wh/kg$_{H_2O}$ | $6.4/10$^3$kg$_{H_2O}$ |
| 10 V/cm[b] | 26 | N/A | 1.0 | 141 | 210 Wh/kg$_{solids}$ | $13/10$^3$kg$_{solids}$ |
| | | | | | 42.7 Wh/kg$_{H_2O}$ | $2.6/10$^3$kg$_{H_2O}$ |
| 1.2 V/cm[c] | 25 | N/A | 19 | 44,000 | 248 Wh/kg$_{solids}$ | $15.4/10$^3$kg$_{solids}$ |
| | | | | | 41.3 Wh/kg$_{H_2O}$ | $2.56/10$^3$kg$_{H_2O}$ |

[a] Fully-continuous prototype
[b] Semi-continuous prototype for solids removal
[c] Batch experiments
[d] Electrical cost based on industrial rates of $0.062/kWh

FIG. 20

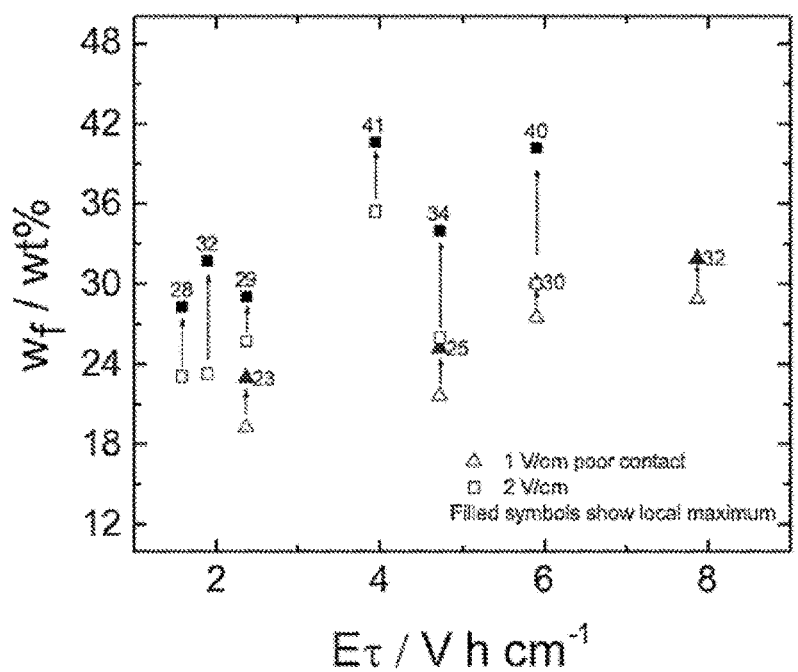

FIG. 21

CONTINUOUS ELECTROKINETIC DEWATERING OF PHOSPHATIC CLAY SUSPENSIONS

CROSS REFERENCE TO RELATED APPLICATIONS

This application is the 35 U.S.C. § 371 national stage application of PCT Application No. PCT/US2015/053998, filed Oct. 5, 2015, where the PCT claims priority to, and the benefit of, U.S. provisional application entitled "CONTINUOUS ELECTROKINETIC DEWATERING OF PHOSPHATIC CLAY SUSPENSIONS" having Ser. No. 62/059,930, filed Oct. 5, 2014, and U.S. provisional application entitled "CONTINUOUS ELECTROKINETIC DEWATERING OF PHOSPHATIC CLAY SUSPENSIONS" having Ser. No. 62/143,303, filed Apr. 6, 2015, all of which are hereby incorporated by reference in their entireties.

This application is related to PCT patent application entitled "Electrokinetic Dewatering of Phosphatic Clay Suspensions" having international application no. PCT/US2013/063192, filed Oct. 3, 2013, which is hereby incorporated by reference in its entirety.

BACKGROUND

A dilute suspension of phosphatic clays is a waste product of phosphate ore beneficiation where the mineral is separated from the ore during processing. The waste clay suspensions, which can initially contain 3-5 wt % of solids, are pumped to large impoundment areas termed clay settling areas (CSAs) for consolidation. However, increase in the solids content proceeds very slowly. In some cases, settling and self-consolidation of the clay can take 25 years to reach a solids content of 25-40 wt %. In central Florida, CSAs cover over 150 square miles, which represents 30% of the mined land.

SUMMARY

Embodiments of the present disclosure are related to electrokinetic dewatering of suspensions such as, e.g., phosphatic clay suspensions. In one embodiment, among others, a system for continuous electrokinetic dewatering comprises a cake formation zone including a first anode and a first cathode each extending horizontally across a first portion of a separation chamber, a cake dewatering zone including a second anode and a second cathode each extending at an upward angle across a second portion of the separation chamber, an inlet configured to supply a dilute feed suspension comprising solids suspended in water to the cake formation zone, and a conveying belt extending horizontally between the first anode and the first cathode and extending at the upward angle between the second anode and the second cathode. The first anode and the first cathode can be energized to establish a first electric field between the first anode and the first cathode, and the second anode and the second cathode can be energized to establish a second electric field between the second anode and the second cathode. The first electric field can form a cake on the conveying belt by consolidating the solids away from the first cathode, and the second electric field can dewater the cake on the conveying belt.

In another embodiment, a method comprises applying a first electric field to a dilute feed suspension between a first pair of electrodes extending across a first portion of a separation chamber, the first electric field forming a cake on a conveying belt extending across the first portion of the separation chamber, conveying the cake on the on the conveying belt from the first portion of the separation chamber to a second portion of the separation chamber, and applying a second electric field to the cake between a second first pair of electrodes extending across the second portion of the separation chamber, the second electric field dewatering the cake on the conveying belt. The conveying belt can be horizontal in the first portion and can extend at the upward angle in the second portion. The first pair of electrodes can comprise a first anode and a first cathode, and can extend substantially parallel with the conveying belt in the first portion. The second pair of electrodes can comprise a second anode and a second cathode, and can extend substantially parallel with the conveying belt in the second portion. The dilute feed suspension can comprise solids suspended in water, which can be consolidated by the first electric field to form the cake on the conveying belt. An inlet can supply the dilute feed suspension to the separation chamber.

In one or more aspects of these embodiments, the conveying belt can discharge the cake from the separation chamber after dewatering. The inlet can comprise an inlet nozzle configured to distribute the dilute feed suspension between the first anode and the first cathode. A pump can supply the dilute feed suspension to the inlet. A supply tank can supply the dilute feed suspension to the pump, and the supply tank can be configured to stir the dilute feed suspension. The dilute feed suspension can be supplied at a constant flow rate. The first cathode can be positioned adjacent to a surface of the dilute feed suspension in the separation chamber, the first cathode substantially parallel to the first anode. The first cathode can comprise a dimensionally stable mesh electrode. The first anode can be positioned below and substantially parallel to an upper portion of the conveying belt in the cake formation zone. The first anode can comprise a plate electrode.

In one or more aspects of these embodiments, the second anode can be positioned below and substantially parallel to an upper portion of the conveying belt in the cake dewatering zone. The first anode can be positioned below and substantially parallel to an upper portion of the conveying belt in the cake formation zone. The second cathode can be positioned above and substantially parallel to the upper portion of the conveying belt. The first cathode can comprise a dimensionally stable mesh electrode. The second cathode can be configured to float on the cake. A power supply can be configured to energize the first anode and the first cathode. The power supply can be further configured to energize the second anode and the second cathode.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 20 is a table comparing examples of semi-continuous and fully-continuous dewatering in accordance with various embodiments of the present disclosure.

FIG. 21 is a plot illustrating the influence of non-uniform clay thickness on dewatering in the cake dewatering zone of the CEKD system in accordance with various embodiments of the present disclosure.

DETAILED DESCRIPTION

Figure 1:
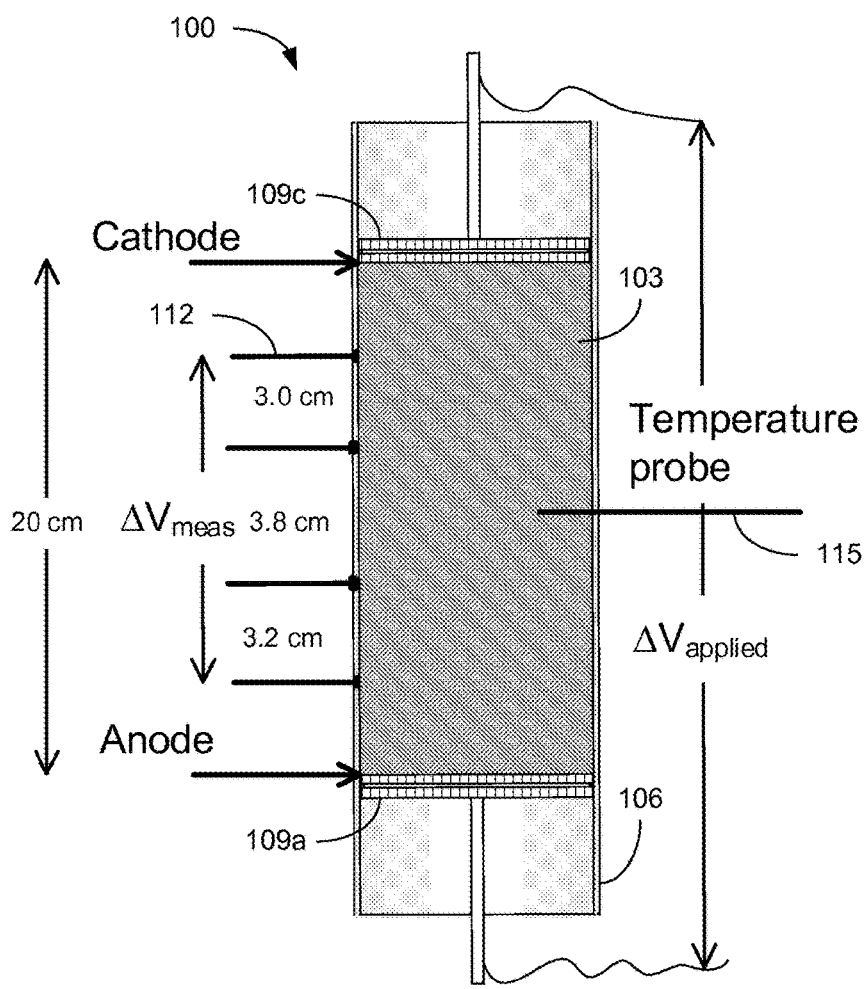
FIG. 1 is a graphical representation of an example of a cell for static consolidation of solids in a phosphatic clay suspension.

Disclosed herein are various embodiments related to electrokinetic dewatering of phosphatic clay suspensions. Reference will now be made in detail to the description of the embodiments as illustrated in the drawings, wherein like reference numbers indicate like parts throughout the several views.

Clay settling areas (CSAs) with an area of about one square mile are commonly used to separate water from the solids in the slurry from a beneficiation plant. Initially, the dilute slurry can include 3-5 wt % solids, which are roughly made up of equal parts of clay, silica, and phosphate. The solids are allowed to settle for further consolidation of the solids. The addition of a flocculating agent may yield about 10 wt % of solids, but further separation can take 25 years or more. An applied electric field can greatly enhance removal of water from the phosphatic clay suspensions associated with the phosphate mining operations. Electrokinetic separation takes advantage of the charge in the suspended particles, without the use of additional materials and/or chemicals.

Figure 2A:
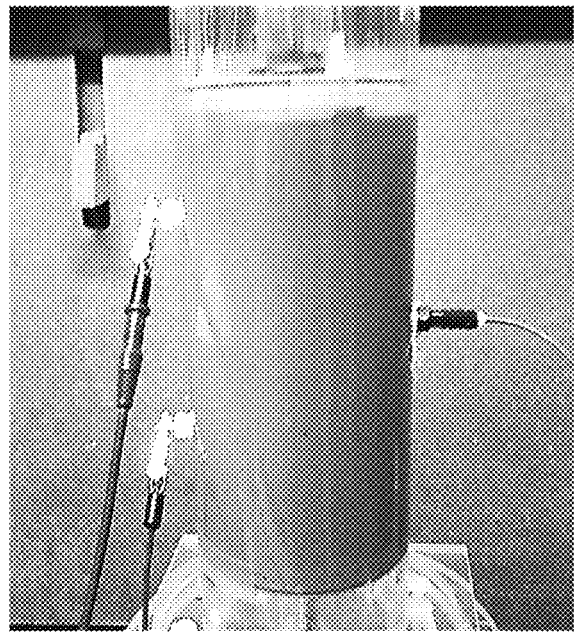
FIGS. 2A and 2B are pictures depicting a cell of FIG. 1 filled with an initial phosphatic clay suspension and a lump of consolidated solids after removal of the supernatant water.
Figure 2B:
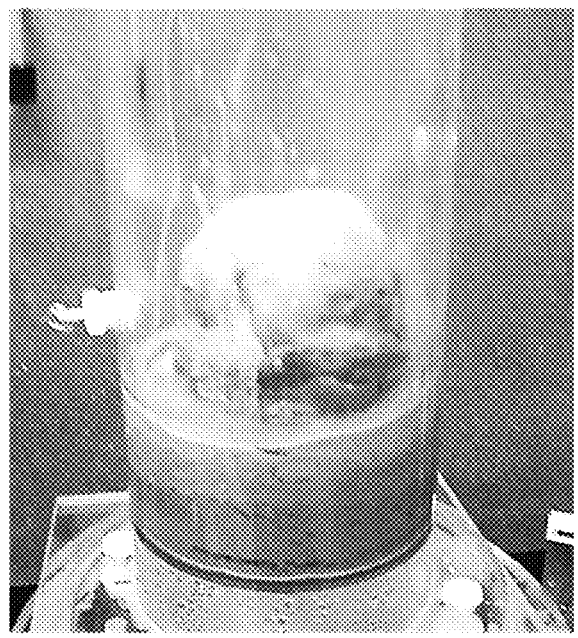

Referring to FIG. 1, shown is a graphical representation of an example of a cell 100 for static consolidation of solids in a phosphatic clay suspension 103. The cell 100 includes a Plexiglas cylinder 106 with electrodes 109 mounted at opposite sides of the suspension 103. The cell 100 is mounted vertically with the cathode 109c placed at the top and the anode 109a placed at the bottom. The electric field produced between the cathode 109c and anode 109a applies a downward force on the negatively charged clay particles towards the positively charged anode 109a. Voltage probes 112 and a temperature probe 115 allowed for monitoring of the phosphatic clay suspension 103 during testing. In a static batch electrokinetic experiment, starting with a suspension of about 10 wt % solids, an electric field of 4 V/cm produced a solids content of about 35 wt % in only 9 hours. FIG. 2A is a picture depicting the cylinder 106 filled with an initial phosphatic clay suspension 103 of about 9.3 wt % and FIG. 2B is a picture illustrating a lump of consolidated solids of about 33.5 wt % after the supernatant water was removed from the cylinder 106.

At short operating times, the increase in solids content was proportional to the product of the electric field and the time over which the field was applied. Maximum solids content was reached with longer operation times and was a strong function of the electric field. The maximum increase in solids content achievable was found to be proportional to the logarithm of the electric field, which can be described by:

$$\Delta w_s = [(0.77tE)^{-n} + (7.1 \log_{10}(E) + 16.5)^{-n}]^{-1/n} \qquad \text{EQN. 1}$$

Where n is a dimensionless parameter that controls the transition from short-time to long-time behavior, E has units of V/cm, and t has units of hours. The change in solids content $\Delta w_s$ is in reference to the initial composition of the suspension 103. Analysis showed that a solids content of about 25 wt % could be achieved in 19 hours with an electric field of 1.2 V/cm at an electrical cost of about $4/1,000 kg of clean water produced. The energy requirement for removal of water ranged from 1.25 to 175 Wh/kg water removed as a function of the electric field.

When this is translated to a one-square-mile CSA, the power requirements for increasing the solids content from about 10 wt % to about 25 wt % are on the order of 40,000 MW. At a cost of $0.10/kW-hr, the energy cost would be approximately $80 million for the water removed. By applying electrokinetic dewatering as part of a continuous or semi-continuous process, the power requirement may be reduced by dewatering over a longer period of time. The gap between the electrodes may also be reduced, allowing operation at a reduced electrode voltage while still obtaining the desired electric field.

Referring to FIG. 3, shown is a graphical representation of an example of an electrokinetic dewatering (EKD) system 300. The EKD system 300 includes a supply tank 303 (or other reservoir) holding a dilute feed suspension 103, which may be stirred to maintain the solids in solution. The solids content of the dilute feed suspension 103 may be, e.g., in the range of about 3-10 wt %. The dilute feed suspension 103 is delivered from the supply tank 303 to a first end of a separation chamber 306 by a pump 309. In the example of FIG. 3, a flow measurement device 312 is included to provide an indication of the influent flow rate being supplied. A metering valve 315 may be used to control the flow of the dilute feed suspension 103 being supplied to the separation chamber 306. In other implementations, the speed of the pump 309 may be controlled (e.g., by a variable speed drive) to control the suspension flow. The pump 309 and/or the metering valve 312 may be automatically controlled based upon indications from the flow measurement device 315.

In the separation chamber 306, an anode 109$a$ is positioned below a cathode 109$c$. For instance, the distance between the anode 109$a$ and cathode 109$c$ may be in the range of about 5 cm to about 10 cm, however the distance between the anode 109$a$ and cathode 109$c$ may varied outside of this range. In the example of FIG. 3, the anode 109$a$ and cathode 109$c$ extend from the first end of the separation chamber 306, where the dilute feed suspension 103 is delivered, to a second end of the separation chamber 306, where an overflow 318 is positioned. With the electrodes 109 energized, the electrokinetic action causes the solids to consolidate at the bottom of the separation chamber 306. As the dilute feed suspension 103 flows from the first end to the second end of the separation chamber 306, supernatant water is separated from the solids. The separated supernatant water may then be removed from the separation chamber 306 by the overflow 318. A turbidity measurement device 324 may be included to measure the turbidity of the removed water.

The anode 109$a$ and cathode 109$c$ receive DC power from a power supply 321 such as, e.g., a potentiostat. The cathode 109$c$ may be positioned below and adjacent to the surface of the liquid (or dilute feed suspension) within the separation chamber 306, which is maintained by the position of the overflow 318 within the separation chamber 306. The anode 109$a$ may be closely spaced below the cathode 109$c$ to reduce the voltage levels applied between the electrodes 109 by the power supply 321. The electrodes 109 may be metallic grids such as, e.g., dimensionally stable mesh electrodes made of titanium with an iridium oxide coating or other material suitable for the environment of the EKD system 300.

Figure 4A:
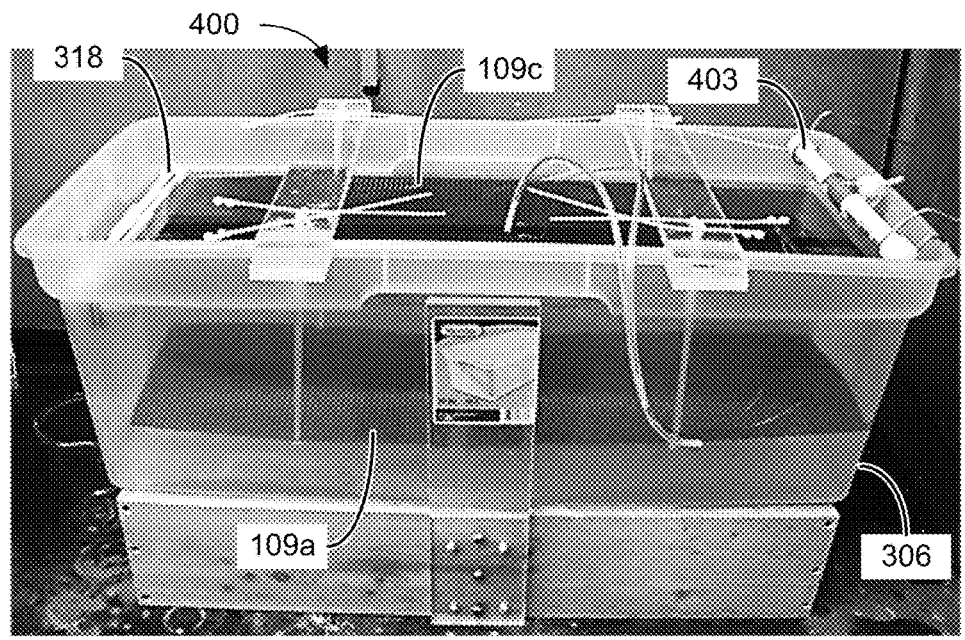
FIGS. 4A-4B are pictures illustrating an example of an EKD system of FIG. 3A in accordance with various embodiments of the present disclosure.
Figure 4B:
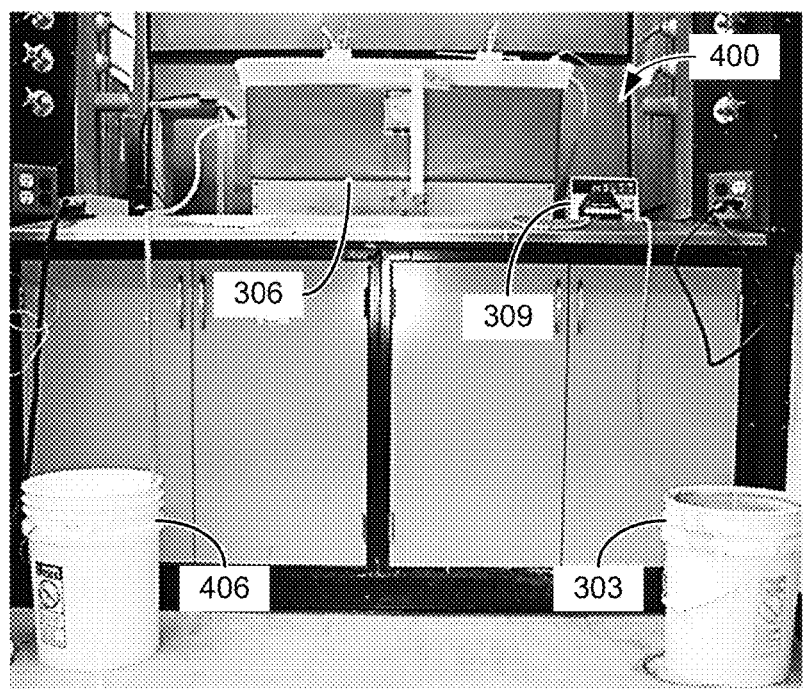

FIG. 4A is a picture illustrating an example of a portion of an EKD system 400 implemented with an inlet nozzle 403 for distributing a dilute phosphatic clay suspension 103 across the first end of a separation chamber 306 and an overflow 318 to remove effluent at the second end of the separation chamber 306, with a cathode 109$c$ positioned between the two ends. An anode 109$a$ is positioned below the cathode 109$c$. FIG. 4B shows an example of the EKD system 400 using the setup of FIG. 4A. The dilute phosphatic clay suspension 103 was supplied on the first side of the separation chamber 306 by a pump 309 (e.g., a metering pump) from a supply tank 303. The supernatant water collected by the overflow 318 was directed to a second reservoir 406.

Figure 5A:
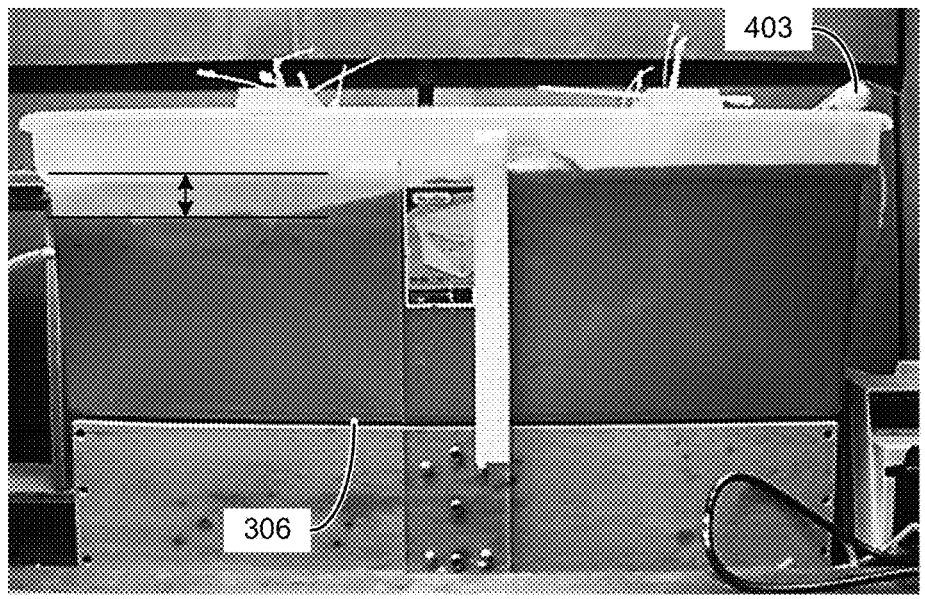
FIGS. 5A-5B and 6A-6B are pictures illustrating experimental results using the EKD system of FIGS. 4A-4B in accordance with various embodiments of the present disclosure.
Figure 5B:
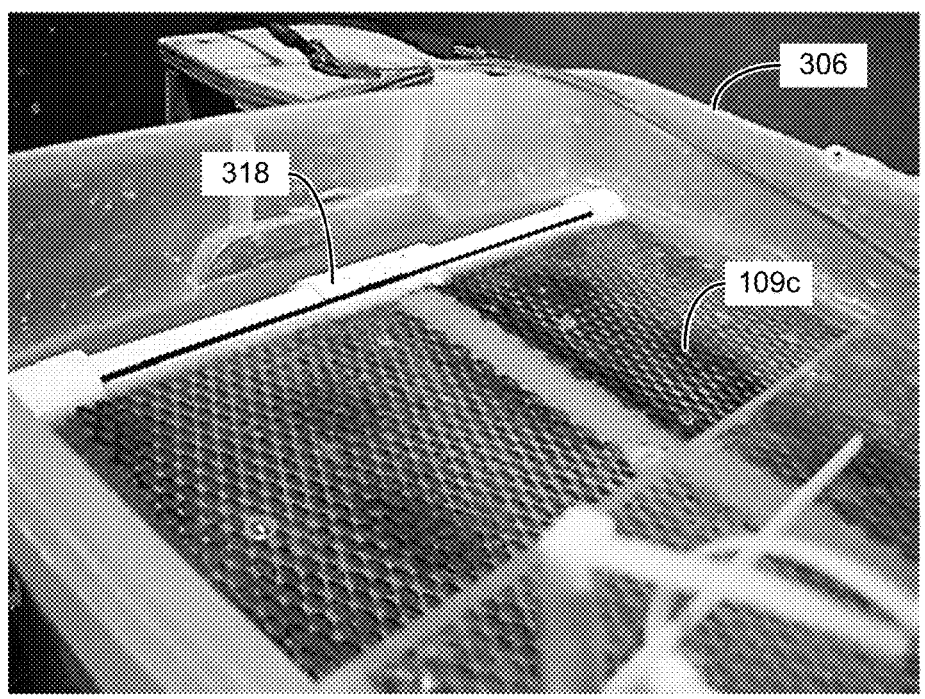

Various experiments were conducted to prove the concept using the EKD system 400 of FIGS. 4A and 4B. In one experiment, a flow rate of 20 ml/min was continuously supplied from the supply tank 303 while maintaining an electric field of 1 V/cm across the electrodes 109. Referring to FIGS. 5A and 5B, shown are side and top views of the separation chamber 306 after about 32 hours of operation of the EKD system 400 at an influent flow rate of 20 ml/min and an electric field of 1 V/cm. As can be seen in the side view of FIG. 5A, the solids begin settling on the first side of the separation chamber 306 allowing a layer of clear water approximately ⅙ of the height of the separation chamber 306 to form in the second side of the separation chamber 306 next to the overflow 318. FIG. 5B shows that the solids have settled below the cathode 109$c$ with clear water over the cathode 109$c$. When tested under the same conditions, except without a voltage applied to the electrodes 109, no separation of the supernatant water from the solids was observed.

Figure 6A:
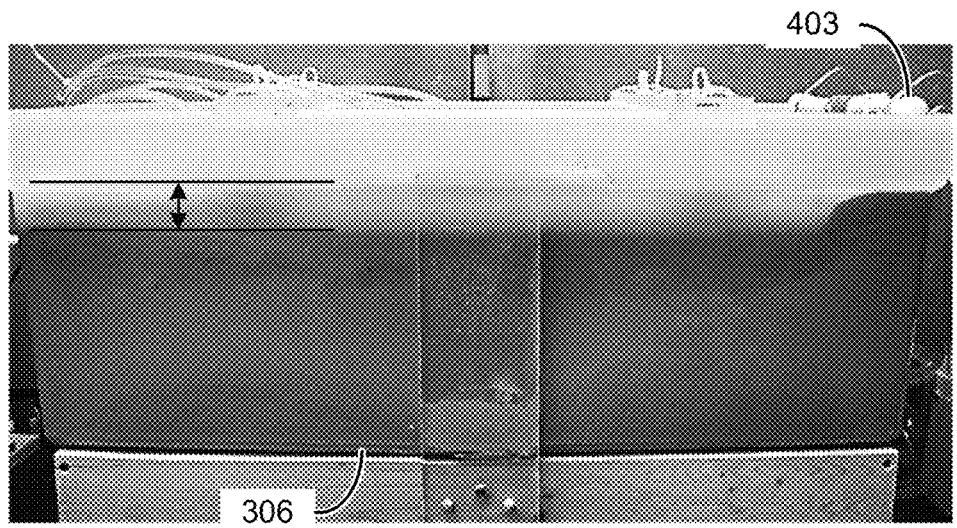
Figure 6B:
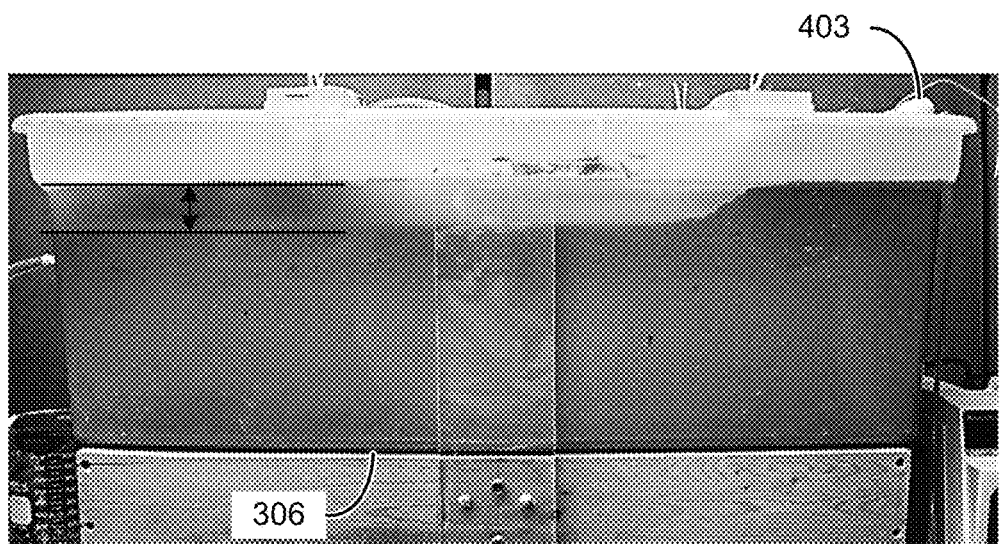

In another experiment, a flow rate of 20 ml/min was continuously supplied from the supply tank 303 while maintaining an electric field of 2 V/cm across the electrodes 109. FIG. 6A illustrates the effect of a higher electric field level after 6 hours of operation. As can be seen in FIG. 6A, operation at the higher electric field produces results that are similar to FIG. 5A in a shorter period of time. FIG. 6B shows the results of an experiment at an influent flow rate of 40 ml/min and an electric field of 3 V/cm. After 4 hours of operation, similar separation of the supernatant water from the solids was observed.

Figure 7:
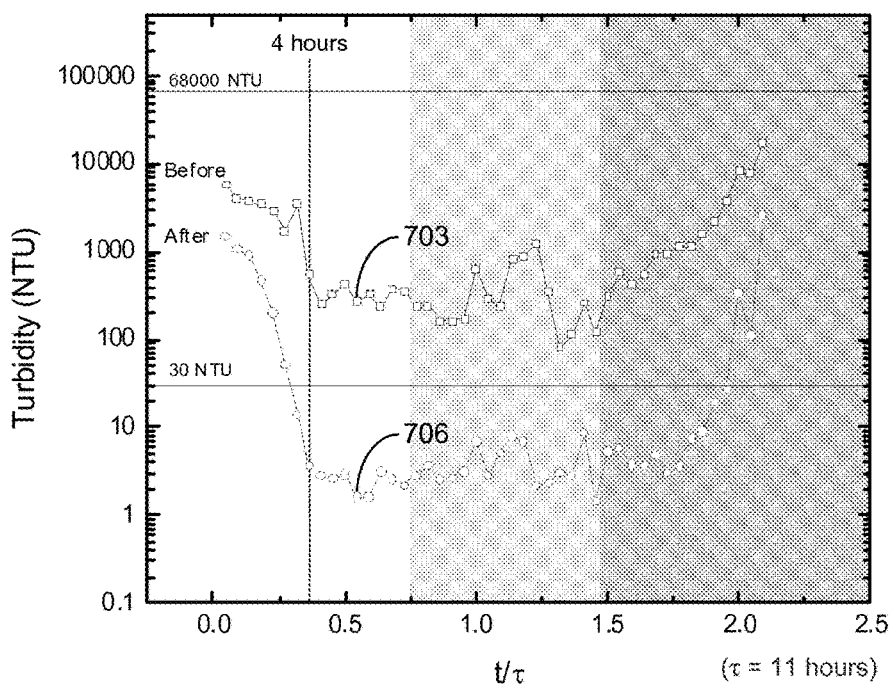
FIG. 7 is a plot of turbidity measurements of various effluent supernatant water samples obtained using the EKD system of FIGS. 4A-4B in accordance with various embodiments of the present disclosure.

Turbidity measurements were conducted on the effluent supernatant water obtained via the overflow 318 of the EKD system 400. Referring to FIG. 7, shown is an example of the turbidity measurements obtained using a HACH 2100Q Portable Turbidimeter for of various effluent supernatant water samples an experiment with an electric field of 3 V/cm and an influent flow rate of 40 ml/min. Effluent samples of supernatant water were collected every 30 minutes during the operation. The supernatant turbidity, measured immediately after the sample was collected, is plotted as curve 703 in FIG. 7 in nephelometric turbidity units (NTU). The turbidity of the initial sample was 68,000 NTU. The turbidity decreased sharply at the beginning of experiment, and reached a steady state condition after about 4 hours. The turbidity remained relatively stable at the low level until the accumulation of solids exceeded the capacity of the separation chamber 306, causing an increase in the effluent turbidity. The effluent sample was allowed to settle in the sample cell for 24 hours after sampling. After settling, the supernatant turbidity of the effluent samples dropped dramatically as indicated by curve 706. During the pseudo-steady-state operation (after about 4 hours), supernatant turbidity was lower than 30 NTU, which satisfies the requirement for process water.

Figure 8A:
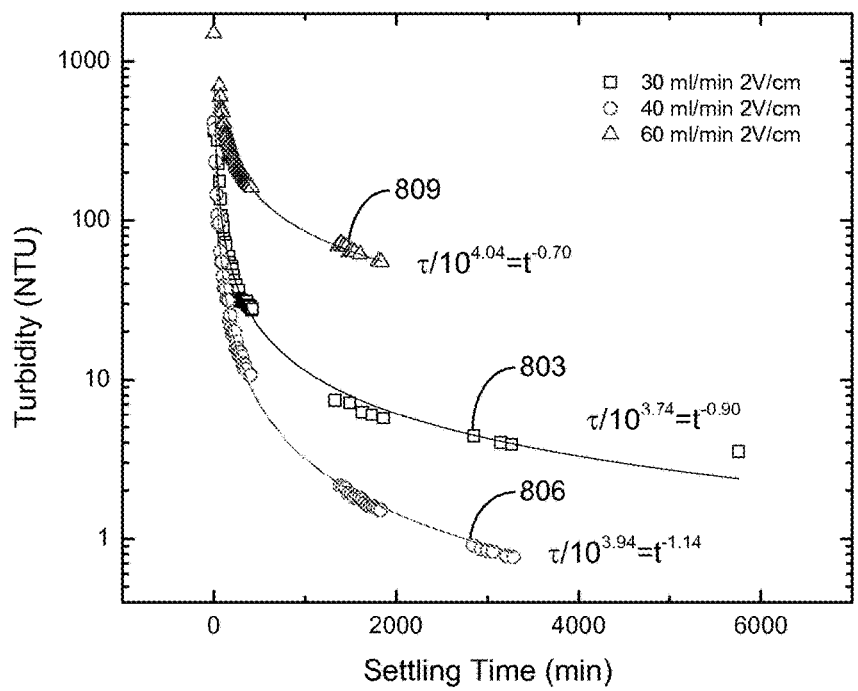
FIGS. 8A, 8B, and 8C are plots of turbidity measurements during free settling of various effluent supernatant water samples obtained using the EKD system of FIGS. 4A-4B in accordance with various embodiments of the present disclosure.
Figure 8B:
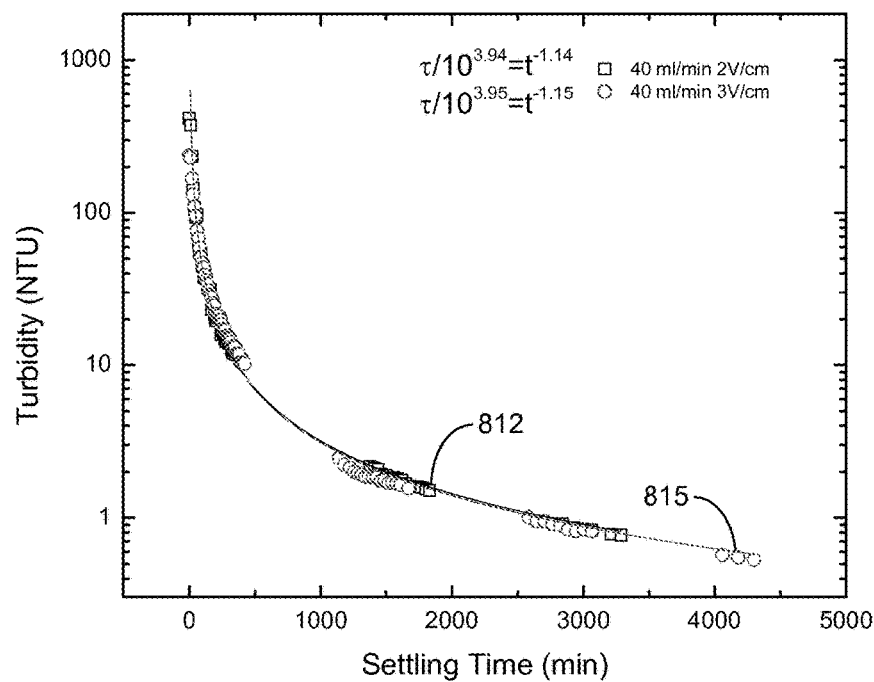
Figure 8C:
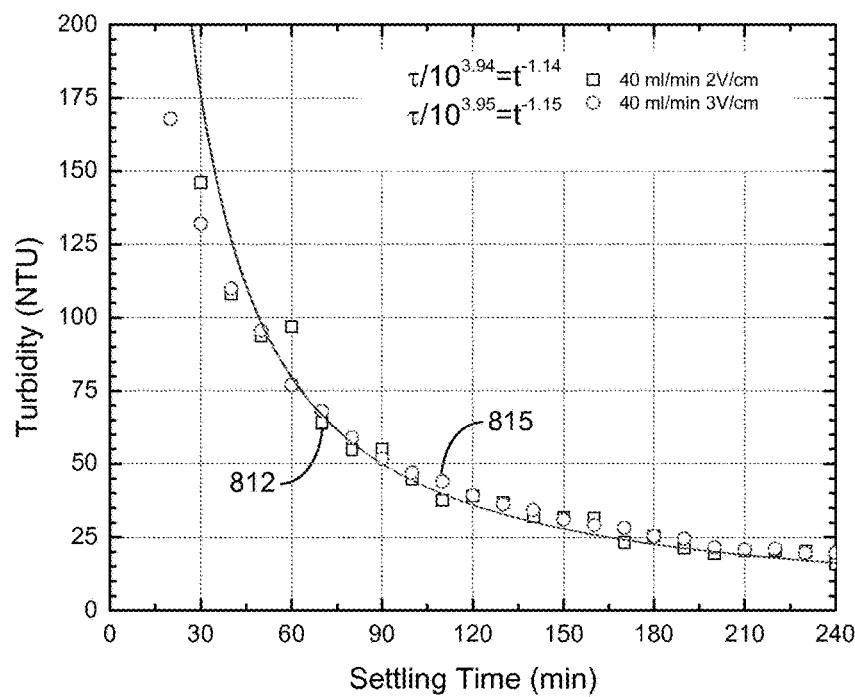

The settling process over a long-term period (2,000 to 6,000 minutes) is illustrated in FIG. 8A for samples that were taken during the pseudo-steady-state part of the experiment. The results indicate that the supernatant turbidity dropped quickly in the first 24 hours to a value less than 10 NTU for experiments conducted at influent flow rates of 30 ml/min (curve 803) and 40 ml/min (curve 806) and applied electric fields of 2 V/cm. Such low values for turbidity were not observed at the higher 60 ml/min flow rate (curve 809). As shown in FIGS. 8B and 8C, similar short-time settling behavior was seen for an influent flow rate of 40 ml/min and applied electric fields of 2 V/cm (curve 812) and 3 V/cm (curve 815). For these conditions, a turbidity of about 50 NTU could be achieved in about 90 minutes of free settling and about 30 NTU in about 140 minutes.

Figure 9:
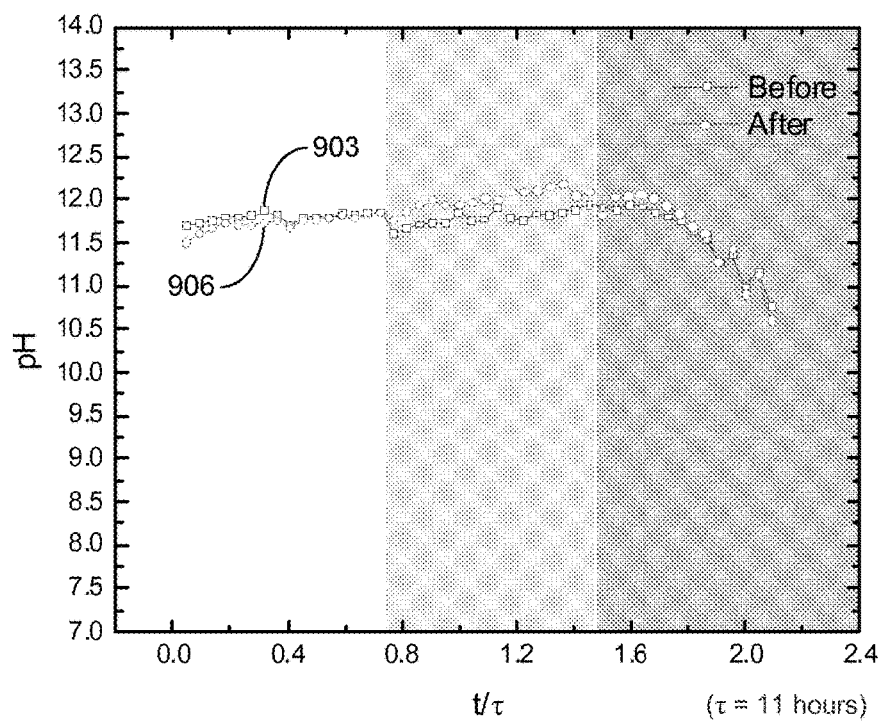
FIG. 9 is a plot of pH measurements of the effluent supernatant water samples of FIG. 7 in accordance with various embodiments of the present disclosure.

The pH of the supernatant water was measured and plotted in a similar manner. The pH of the phosphatic clay suspension 103 entering the separation chamber 306 was equal to 7. As shown in FIG. 9, the pH of the supernatant samples increased rapidly to about 11.7 and remained stable around this value until the accumulation of solids exceeded the capacity of the separation chamber 306. There was no significant change of pH before (curve 903) and after (curve 906) the free settling of supernatant samples. The alkalinity of the supernatant water is a result of the electrochemical reaction at the cathode 109*c* that dissociates the water to create hydrogen gas ($H_2$) and hydroxide ions ($OH^-$). Experiments were also performed to determine the effect of pH on the sedimentation at different pH values. Sedimentation of two samples with pH values of 7.1 and 11.7 were observed over 10 days. The results indicate that the alkaline character of the supernatant water does not account for the improved the dewatering process. Thus, the small value of supernatant turbidity after settling can be attributed to the electrokinetic dewatering (EKD) process.

Figure 10:
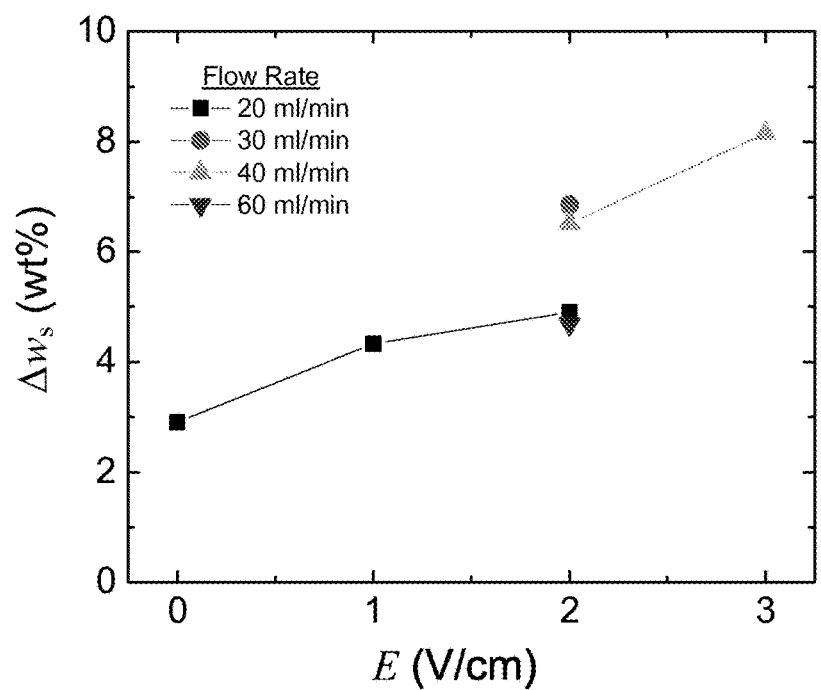
FIG. 10 is a plot of change in solids content ($\Delta w_s$) with respect to applied electric field (E) at various flow rates using the EKD system of FIGS. 4A-4B in accordance with various embodiments of the present disclosure.

The solids content of the residual clay samples removed from the separation chamber 306 after dewatering was also measured before and after every experiment. The change in solids content ($\Delta w_s$), presented in FIG. 10, shows that the increase in solids content is strongly dependent on the applied electric field (E), which is in agreement with EQN. 1. At an energy cost of $0.10/kW-hr, the EKD system 400 of FIGS. 4A and 4B operates at an energy cost of about $3/1,000 kg of clean water produced.

A semi-continuous process such as that demonstrated by the EKD system 400 of FIGS. 4A and 4B includes continuous flow of the dilute feed suspension 103 through the separation chamber 306 until the accumulation of solids reach or exceed the capacity of the separation chamber 306, at which time the flow of the dilute feed suspension 103 is suspended while the consolidated solids are removed from the separation chamber 306. A continuous process allows for removal of the accumulated solids from the separation chamber 306 without interrupting the flow of the dilute feed suspension 103. A removal mechanism located in the bottom of the separation chamber 306 may be used to extract the solids have settled in the separation chamber 306.

As illustrated by the example of FIG. 3, supernatant water can be recovered from clay slurry as it is continuously pumped through the separation chamber 306. The water can be removed from the clay under the influence of an electric field produced by a pair of mesh electrodes 109*a* and 109*c* suspended in the separation chamber 306. A stream of low-turbidity water can be continuously obtained from an overflow 318 during pseudo-steady-state operation. The thickened clay accumulates in the separation chamber 306 and can be removed in a variety of ways. For example, a conveyor belt can be implemented to transport the thickened clay out of the separation chamber 306. The movement of the conveyor belt can continuously remove the thickened clay from the slurry. In one embodiment, the conveyor belt can surround an anode plate 109*a*. The speed of the conveyor belt can be adjusted to control the removal of the dewatered clay.

Figure 3A:
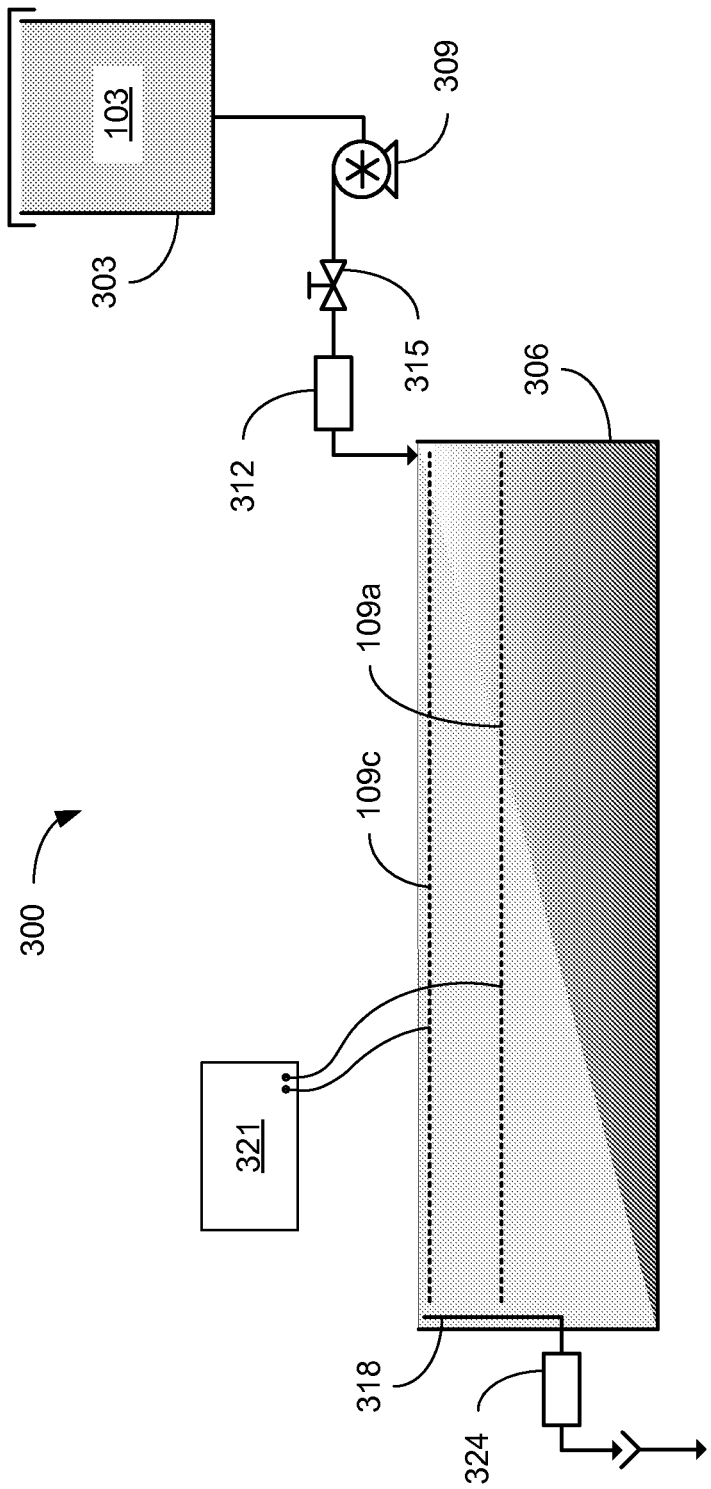
FIGS. 3A-3D are graphical representations of examples of an electrokinetic dewatering (EKD) system in accordance with various embodiments of the present disclosure.
Figure 3B:
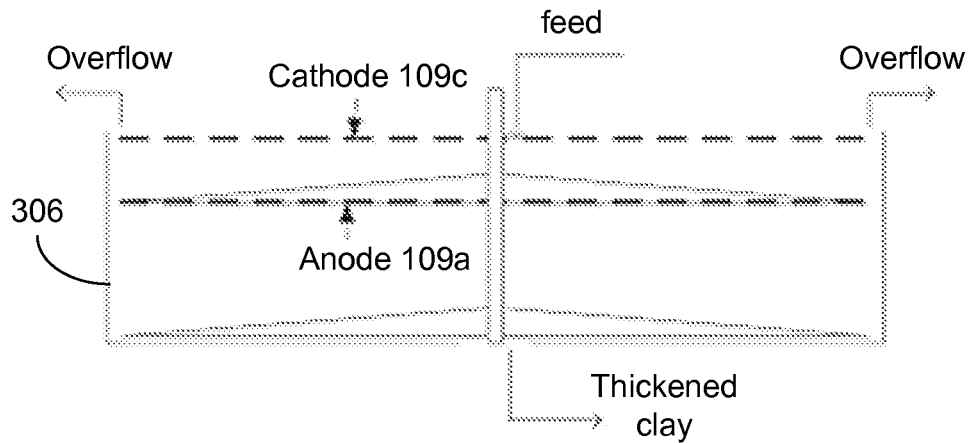
Figure 3C:
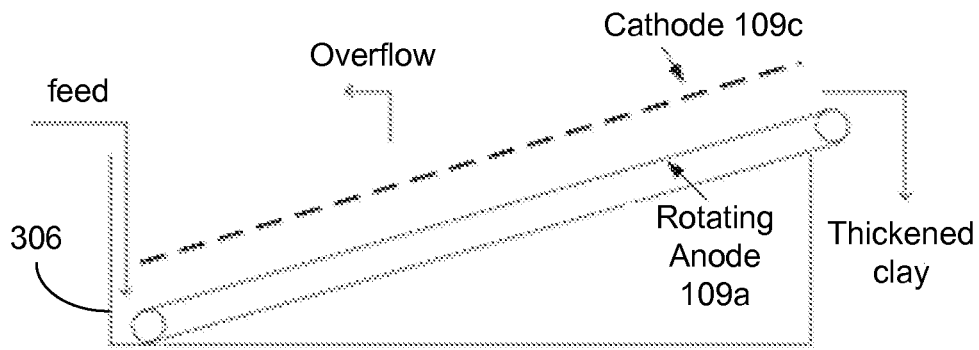
Figure 3D:
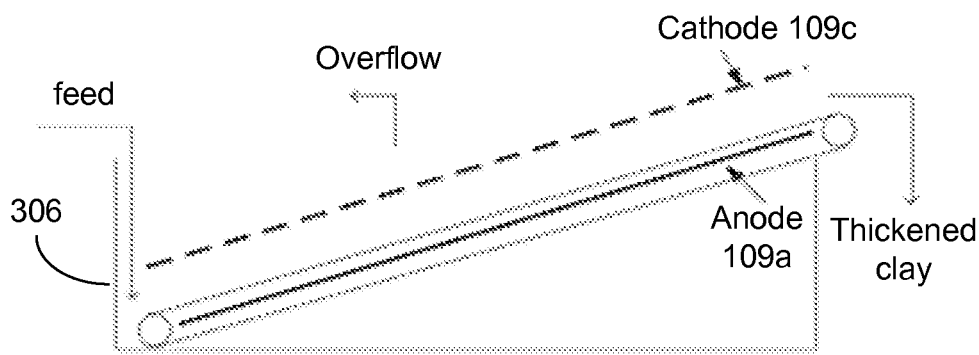

FIGS. 3B through 3D show three examples of thickened clay removal. Referring to FIG. 3B, a scraper can be used to remove solids from the separation chamber 306. A pair of electrodes can be suspended in the tank to conduct electrokinetic dewatering. A first scraper can be implemented above the anode 109*a* and a second scraper can be placed at the bottom of the separation chamber 306. Both scrapers can be rotated at very low speed to remove the thickened clay accumulated on anode 109*a*. The initial clay suspensions can be fed into the top of the separation chamber 306, and the thickened clay can be discharged from the bottom as illustrated.

Referring next to FIG. 3C, a rotating anode can be used to remove the thickened clay. Instead of a horizontal configuration, the electrodes can be tilted with a small angle which allows one end of the electrodes 109 to remain under suspension, with the other end exposed in air. The feed clay suspensions can be pumped into the suspension chamber 306 near the lower end of the electrodes 109, with the thickened clay being moved with the rotating anode 109*a*, and leave the tank from the higher end. FIG. 3D shows another example using a stationary anode 109*a* (e.g., a plate anode) and a non-conductive rotating belt that surrounds the anode 109*a* to remove the thickened clay.

Both the supernatant water and thickened clay can be continuously removed from the clay suspension using a continuous electrokinetic dewatering (CEKD) system that includes two zones: a clay formation zone and a clay dewatering zone. Water can be removed from the clay suspension in the clay formation zone to produce the thickened clay. In the clay dewatering zone, the thickened clay can be moved out of suspension while continuing to apply the electrokinetic dewatering.

Figure 11A:
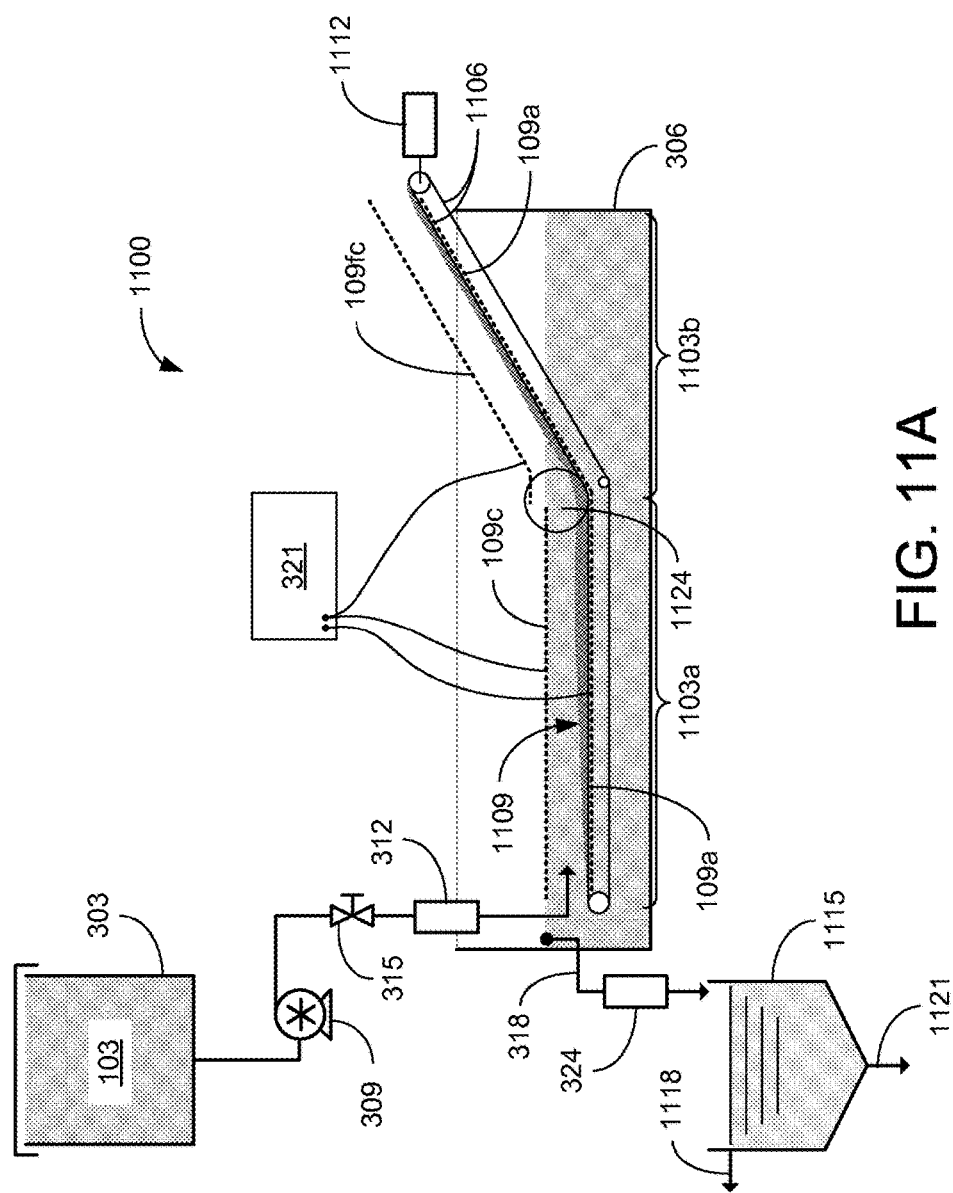
FIGS. 11A and 11B are graphical representations of an example of a continuous EKD (CEKD) system in accordance with various embodiments of the present disclosure.
Figure 11B:
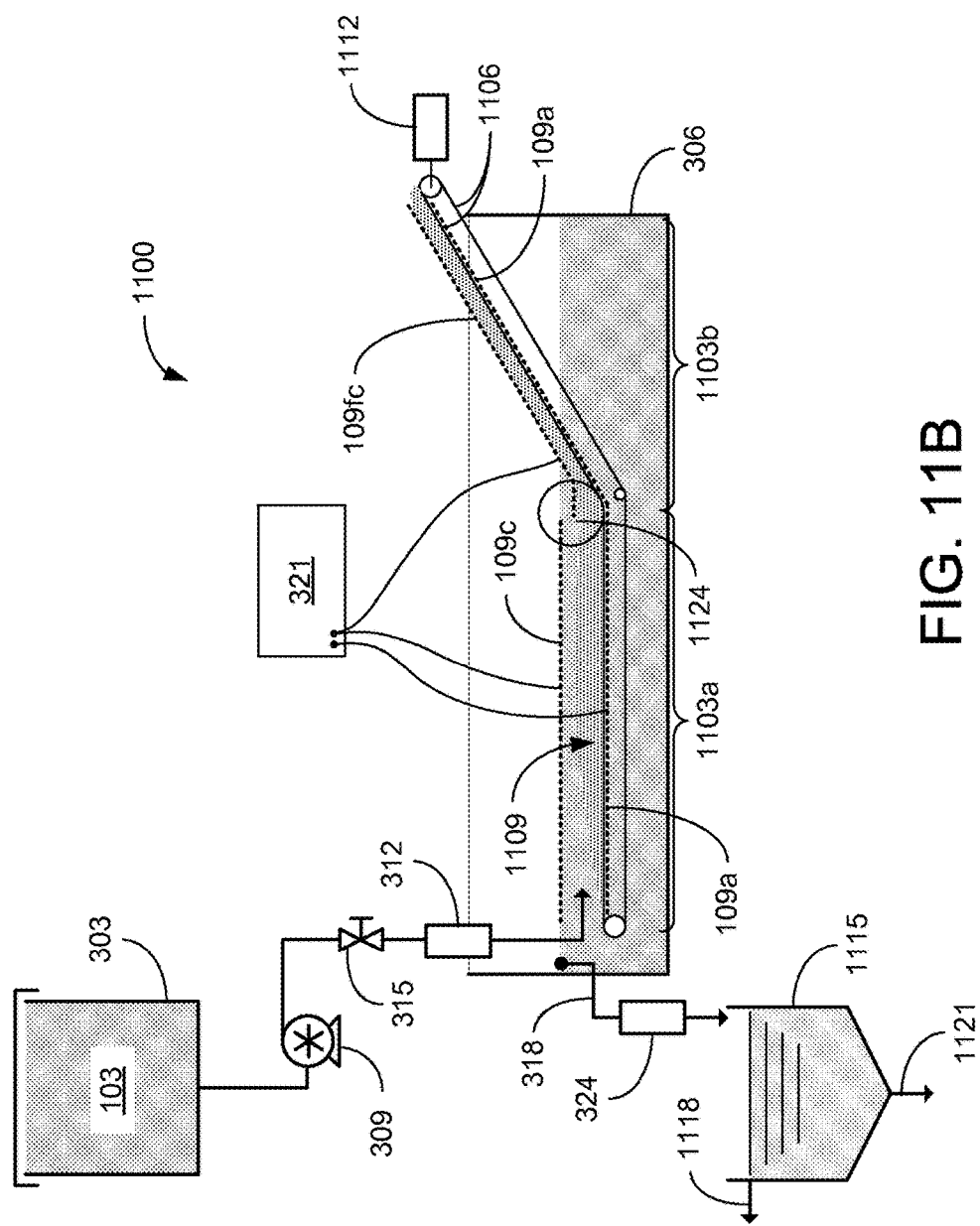

Referring to FIGS. 11A and 11B, shown are graphical representations of an example of a continuous electrokinetic dewatering (CEKD) system 1100. As in the EKD system of FIG. 3, the dilute feed suspension 103 is delivered from the supply tank 303 to a separation chamber 306. A continuous influent flow rate may be provided by pump 309. The CEKD system 1100 can be divided into two functional regions: a horizontal cake formation zone 1103*a* and an angled cake dewatering zone 1103*b*. In each zone 1103, a pair of electrodes 109 is positioned on either side of a rotating conveying belt 1106. In the horizontal cake formation zone 1103*a*, a cake 1109 can be formed on the conveying belt 1106 through electrophoresis. Under the influence of the constant electric field established between the cathode 109*c* and anode 109*a*, the dispersed particles in the influent will migrate toward the conveying belt 1106, where they settle and form a layer of cake 1109 on an upper portion of the conveying belt 1106. Chemical reactions at the electrodes 109 can also cause the pH level between cathode 109*c* and anode 109*a* to decrease.

As the conveying belt 1106 is rotated, the cake 1109 is transferred to the angled cake dewatering zone 1103*b*, where the cake 1109 is removed from the separation chamber. Additional water can be removed from the cake 1109 through electro-osmosis. By applying a constant electric field across the cake 1109, electro-osmotic flow can be induced to remove a portion of the water remaining in the cake 1109. As the cake 1109 is moved along the conveying belt 1106 in the angled cake dewatering zone 1103*b*, the cake 1109 continues to thicken until it is discharged from the end of the conveying belt 1106. In this way, it is possible to produce clay cake with solid contents of more than 25%. The thickened cake 1109 can be collected for further drying and/or disposal.

As shown in the example of FIGS. 11A and 11B, the CEKD system 1100 includes a conveying belt 1106 that is horizontally positioned in the cake formation zone 1103*a* and is angled upward in the cake dewatering zone 1103*b*. An anode 109*a* can be positioned between the top and bottom portions of the conveying belt 1106, and directly below the top portion of the belt. In the cake formation zone 1103*a*, an anode 109*a* is located above (or between the sections of) the conveying belt 1106, and the cathode 109*c* is located above the conveying belt 1106, approximately at the water level in the separation container 306. The dilute feed suspension 103 can be delivered from the supply tank 303 to the separation chamber 306 between the anode 109*a* and cathode 109*c*. In other implementations, the dilute feed suspension 103 can be provided at other points in the separation chamber 306. With the electrodes 109 energized by the power supply 321, supernatant water is separated from the solids as the dilute feed suspension 103 flows between the electrodes 109. Electrophoresis can cause the suspended particles to collect on the conveying belt 1106. As the cake 1109 settles on the conveying belt 1106, it is driven forward by an electric motor 1112 (e.g., a stepper motor) to move the layer of cake 1109 from the cake formation zone 1103*a* to the cake dewatering zone 1103*b*.

While the solids consolidate on the conveying belt 1106, the separated supernatant water may be removed from the separation chamber 306 by the overflow 318. As the particles settle out of the influent, the cleanest water collects around the cathode 109*c*, where it can be collected by one or more overflows 318 located at the end or on the sides of the separation chamber 306, adjacent to the cathode 109*c*. The supernatant water can be sent to a clarifier 1115, where it may be allowed to settle to further reduce the turbidity of the process water effluent 1118. It is desirable for the product water 1118 to have a turbidity lower than 30 NTU, which would be appropriate for recycling back to the beneficiation plant. As the solids settle to the bottom of the clarifier 1115, they may be discharged as a solids-rich effluent 1121 for further processing.

In the cake dewatering zone 1103*b*, a floating cathode 109*fc* is located above the conveying belt 1106 and the anode 109*a*. A plurality of wheels 1124 aid in the transition of the conveying belt 1106 from the horizontal orientation to the angled orientation. The wheels 1124 allow the conveying belt 1106 to smoothly transition, which aids in the transport of the cake 1109 between the formation and dewatering zones. The wheels may be configured to help evenly distribute and/or breakup the cake 1109 across the conveying belt 1106. The angled conveying belt 1106 transports the cake 1109 out of the feed solution in the separation chamber 306. As the conveying belt 1106 moves the cake 1109 out of the feed solution, electro-osmosis can further dewater the cake 1109 before it is discharged for further processing and/or disposal.

During initial operation of the CEKD system 1100, the floating cathode 109*fc* is supported away from the conveying belt 1106. As the layer of cake 1109 begins to build up on the conveying belt 1106, the floating cathode 109*fc* can be lowered toward the belt until the floating cathode 109*fc* is resting (or floating) on the cake 1109 as illustrated in FIG. 11B. By reducing the distance between the floating cathode 109*fc* and the anode 109*a*, dewatering of the cake 1109 can be improved, thereby producing higher solids content of the cake 1109. Higher field strength levels and/or lower power consumption, as well as reduced temperature and sensitivity to the feed location, can be achieved during steady state operation with the floating cathode 109*fc* released on the cake 1109.

Figure 12A:
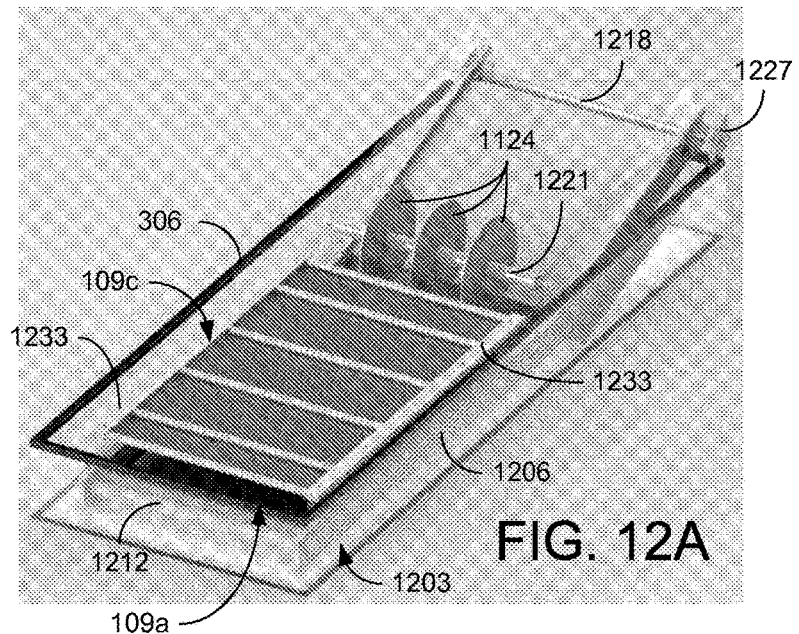
FIGS. 12A through 12E are graphical representations of an example of the CEKD system of FIGS. 11A and 11B in accordance with various embodiments of the present disclosure.
Figure 12B:
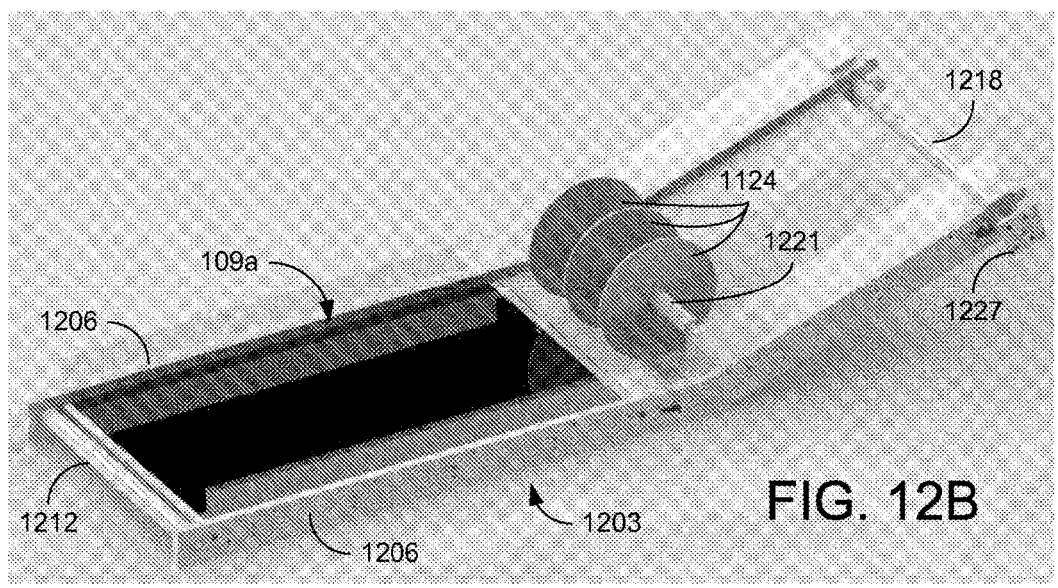
Figure 12C:
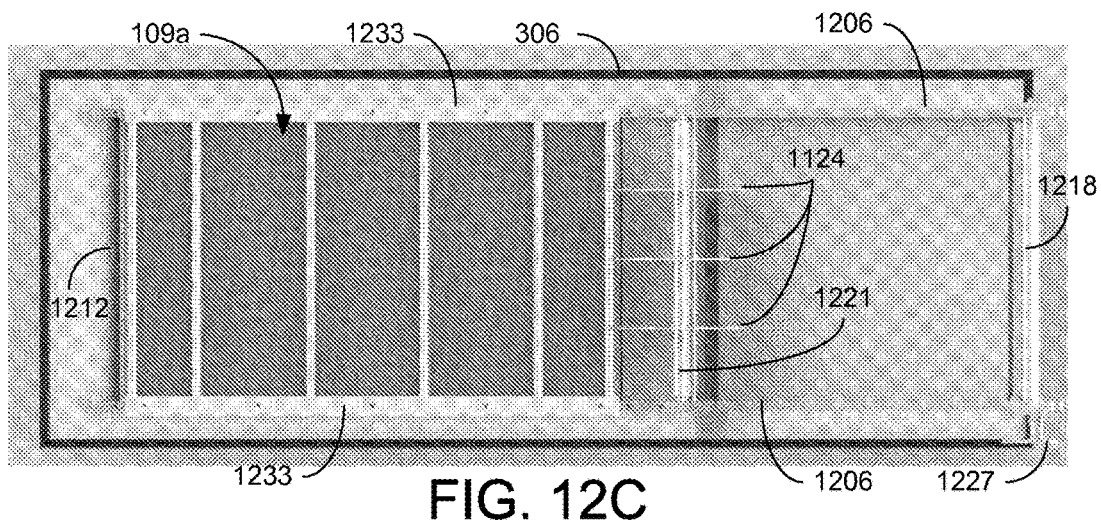
Figure 12D:
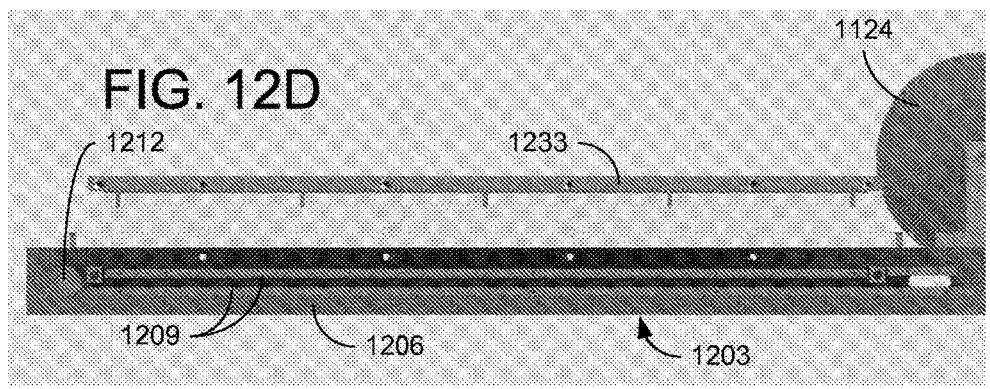
Figure 12E:
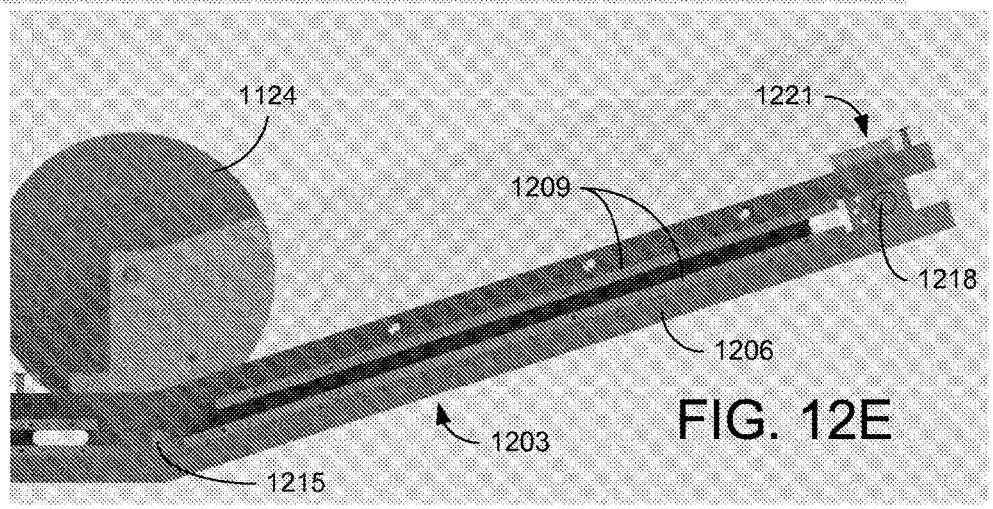

Referring to FIGS. 12A through 12E, shown are graphical representations illustrating the construction of the CEKD system 1100. FIGS. 12A and 12B are an isometric views, FIG. 12C is a top view, and FIGS. 12D and 12E are side views of the CEKD system 1100. In the example of FIGS. 12A through 12E, a rectangular tank is used as the separation container 306. A frame 1203 for supporting the electrodes 109 and conveying belt 1106 is positioned within the separation container 306. The frame 1203 includes sidewalls 1206 and support plates 1209 that support rollers (bottom roller 1212, middle roller 1215, and top roller 1218) for the conveying belt 1106 (not shown). A plurality of wheels 1124 hold the conveying belt 1106 in place during the transition from horizontal to angled. The wheels 1124 can be discs that are held in position across the conveying belt 1106 by a shaft and spacers 1221. A tension adjuster 1224 can be provided at the top roller 1218 (and/or at the bottom roller 1212) to maintain proper tension on the conveying belt 1106. The drive motor 1112 for the conveying belt 1106 can be mounted at the top end using a motor platform 1227 or other appropriate mounting arrangement.

In the cake formation zone 1103*a*, the anode 109*a* is positioned within the conveying belt 1106 and just below the upper portion upon which the cake 1109 forms. Anode support bars 1230 can be used to hold the anode 109*a* in position. The cathode 109*c* is held a fixed distance above the anode 109*a* by a cathode support frame 1233. In the cake dewatering zone 1103*b*, the anode 109*a* is also positioned within the conveying belt 1106 and can be held in position using anode support bars (not shown). The floating cathode 109*fc* can be supported over the conveying belt 1106 using a variable support frame substantially parallel to the anode 109*a*, and that can lower the floating cathode 109*fc* and allow it to ride on the cake 1109 during steady state operations of the CEKD system 1100.

Figure 13:
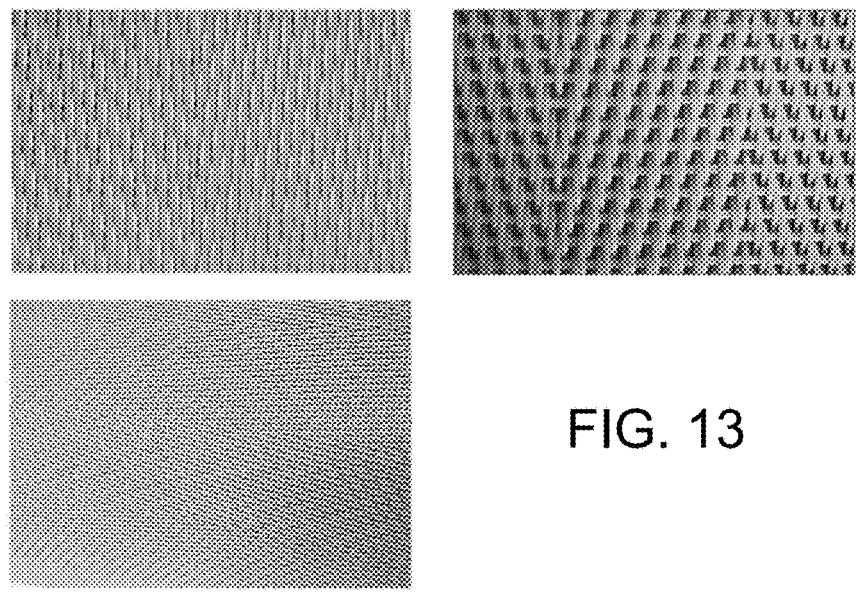
FIG. 13 includes images of conveying belt materials that can be used in the CEKD system of FIGS. 11A and 11B in accordance with various embodiments of the present disclosure.

A porous mesh fabric can be used for the conveying belt 1106 to allow fluids to pass through while the solid particles are deposited on the belt. To keep the energy and power consumption low, it is desirable to keep the resistance of the belt as low as possible. For example, mesh belts made from polyester fiber can be used for the formation and dewatering of the cake 1109. The use of polyester allows the cake to be easily removed from the belt, and provides for easy cleaning and a long service life. FIG. 13 shows images of various sludge dewatering belts with different mesh designs that can be used in the CEKD system 1100. These can include commercially available belts and/or filters from, e.g., National Filter Media (see, e.g., http://www.wiremeshdragon.cn). A variety of belt materials was tested to evaluate the effects on the formation and dewatering of the cake 1109.

When implementing CEKD system 1100 with a rotating belt, characteristics of the belt material such as, e.g., flexibility, electric non-conductivity, small potential drop across the belt, good change in solids content, and/or low cost can be considered. Filter cloth used in the filter press industry offers the properties of flexibility, non-conductivity and low cost. The potential drop and change in solids content were examined through testing conducted in a cylindrical cell 100 such as the one illustrated in FIG. 1. Five samples with various thickness and open areas were tested. These test samples were trimmed to be the same shape and size as the anode 109*a* (FIG. 1), and placed on top of the anode 109*a* for testing, and one control experiment was conducted without the filter. The total current and local potential drop were recorded every 30 minutes during the operation, and the solids content of clay was measured before and after each experiment.

Testing was conducted using a setup similar to the cell shown in FIGS. 1 and 2A-2B. An anode was placed at the bottom of the cell with a test filter placed on the surface of the anode. A phosphatic clay suspension with an initial solids content of about 10 wt % was filled in cell and a cathode was placed on top. An electric field of 4 V/cm was applied between electrodes for 4 hours, with the current and potential drop between the reference electrodes measured at 30 minutes intervals. After each experiment, supernatant water was removed and the clay solid content was calculated. A control experiment was also carried out using the original anode without a filter. The highest change of solids content was achieved with a filter that had the largest open area (or porosity) of 50%. The change of solids content $\Delta w$ for the experiments with the samples was very close to that obtained from the control experiment, with the belt material having the biggest open area (50%) and smallest thickness (0.37 mm) achieving the highest change in solids content of about 13.8 wt %. The lowest change of solid content was obtained with the belt material having the smallest open area (23%) and a larger thickness. The current and potential also showed the same trend, indicating a lower resistance with the larger open area. The belt material with the biggest open area and smallest thickness maintained the highest normalized current throughout the operation. The local potential was high at the beginning, and dropped slightly at the end of experiment. The normalized current and potential value was close to 1, indicating a very small difference from the control experiment. Evaluation of the test results indicated that the largest open area and the lowest thickness provided the best efficiency.

Figure 14A:
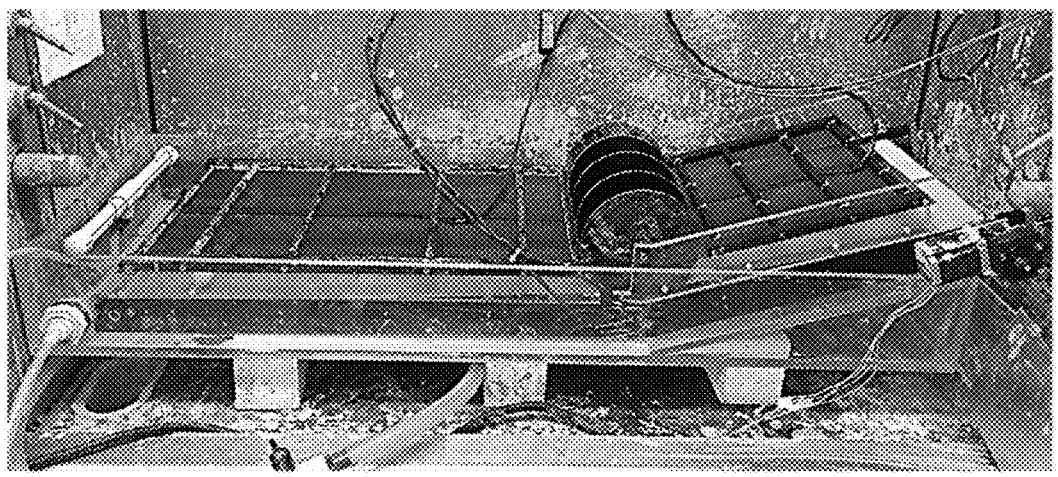
FIGS. 14A through 14C are images of an example of the CEKD system of FIGS. 12A through 12E in accordance with various embodiments of the present disclosure.

Referring now to FIG. 14A, shown is an image of an example of a CEKD system 1100 (FIGS. 11A-11B). A shallow tank was made of acrylic material with dimensions of 1.3 m×0.5 m×0.15 m was used as the separation container 306. A pair of parallel electrodes 109a and 109c (FIGS. 11A and 11B) were placed horizontally in the shallow tank. The clay cake was formed under an applied electric field in the horizontal part, and removed by the moving belt 1106 in the angled region. The angled region includes a pair of electrodes 109a and 109fc as shown in FIGS. 11A and 11B. The dimensionally stable electrodes 109 (e.g., titanium with iridium oxide coating from Water Star Inc.) and the conveying belt 1106 (e.g., U-CMY-530 belt material from Component Supply Co.) were constructed on a frame which fit in the shallow tank.

As discussed, the CEKD system 1100 of FIGS. 11A and 11B can be divided into two function regions: the horizontal cake formation zone 1103a and the angled cake dewatering zone 1103b. In each zone, a pair of electrodes 109 was placed in parallel. The rotating conveying belt 1106 (FIGS. 11A and 11B) was moving around the anode 109a, making a slight turn at the junction of the two regions. The electrodes 109c and 109a in the horizontal cake formation zone 1103a had dimensions of 0.73 m×0.38 m, and the electrodes 109fc and 109a in the angled cake dewatering zone 1103b had dimensions of 0.45 m×0.38 m. The anodes 109a were made as a solid plate, and the cathodes 109c and 109fc were made as a mesh to allow gas and liquid to pass through. The two zones can be connected by a single conveyor belt surrounding the anode 109a in both zones.

A step motor 1112 and worm gear combination was used to provide enough driving force to move the conveying belt 1106 under the load of the cake 1109 The conveying belt 1106 can be connected by sewing the ends together, which worked very well, or using fasteners to connect the two ends. Epoxy glues may be used, but these can fail under constant use in the aqueous environment with a strong tension on the conveying belt 1106. The belt speed was controlled between 0.3 m/hour and 2 m/hour. The electric potential across the electrodes 109 was generated by a DC power supply 321, which was connected to the cathode 109c/109fc and anode 109a using copper wire. The cathode 109c in the horizontal zone was connected to the floating cathode 109fc in the angled zone, and the anode 109a in the horizontal zone was connected to the anode 109a in the angled zone. It was configured in this way to eliminate unnecessary current flow.

A 10 wt % feed phosphatic clay suspension 103 (FIGS. 11A-11B) was pumped at a controlled speed from the beginning (left) of the horizontal cake formation zone 1103a. The liquid level was maintained at about 5 mm above the cathode 109c. Overflow supernatant water was collected at the center of the cake formation zone, and removed by pumping (e.g., by aspiration using a peristaltic pump). In other implementations, the overflow supernatant water could be removed by gravity via a weir was constructed along one or more sides of the separation container 306. The distance between the cathode 109c and anode 109a could be adjusted between 3.2 cm and 6.2 cm. In the cake formation region 1103a, electrophoresis played the key role, and the solids were attracted to the anode 109a by the electric field to form a cake 1109 on the conveying belt 1106.

Figure 14B:
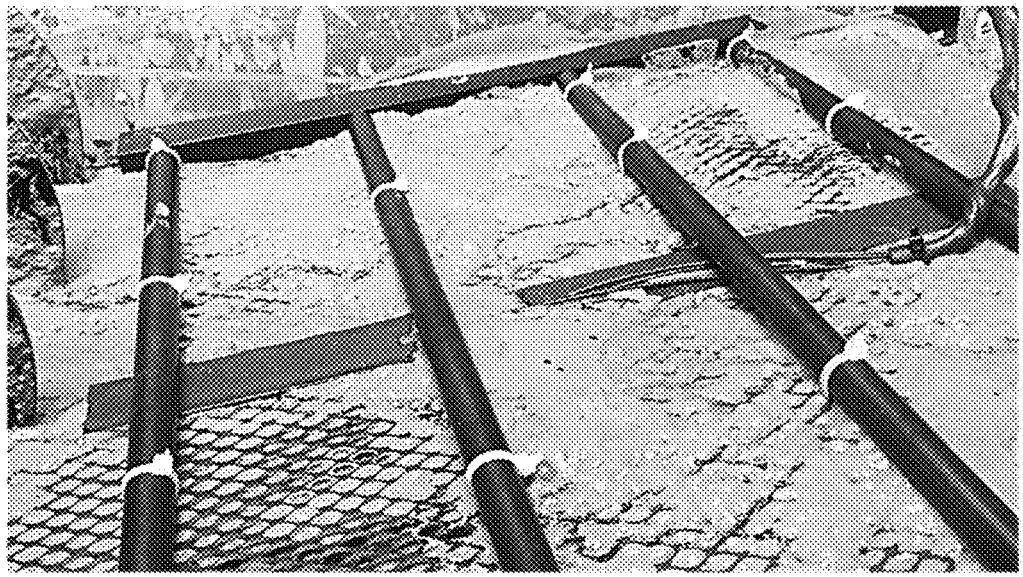

As the layer of clay cake 1100 is finished in the horizontal cake formation zone 1103a and starts to enter the angled dewatering zone 1103b, the conveying belt 1106 makes a slight turn by applying a uniform force on conveying belt 1106, without affecting the clay cake 1109 formed on it. In the example of FIGS. 14A and 14B, five wheels 1124 were placed above the conveying belt 1106 to provide the force, and one or more fishing line can be extended across the belt to further distribute the bending force. For example, nylon fishing line such as Zebco Omniflex monofilament 30 lb. test (0.023 inch diameter) can be used. Previous experiments showed that the fish line would not affect the clay cake 1109 on conveying belt 1106. The fishing line was strong enough to maintain the applied force on the belt 1106 and thin enough to keep the clay cake undisturbed.

The angled cake dewatering zone 1103b pulls the thickened clay solids formed on the conveying belt 1106 out of tank, and applies further electrokinetic dewatering on clay cake 1109. The largest portion of the angled conveying belt 1106 is above water. Since the clay entered the angled cake dewatering zone 1103b as a paste-like structure, it stayed on the upper portion of the conveying belt 1106 and supported the floating cathode 109fc. The height of the floating cathode 109fc can be adjusted by the screws on frame. During steady-state operation, the floating cathode 109fc was loosely placed on the clay cake 1109 to maximize the contacting area. After dewatering, the thickened cake 1109 was conveyed out of the separation container 306 and collected. In the cake dewatering zone 1103b, electro-osmosis played the key role, and squeezed additional water out of the clay cake 1109 by electric force, which flowed back to the tank. FIG. 14B shows an image of the floating cathode 109fc resting (or floating) on the cake 1109 during operation of the CEKD system 1100. During the steady-state operation, the clay cake 1109 is formed in the cake formation zone 1103a, thickened in the cake dewatering zone 1103b, and collected after been dropped from the conveyor belt 1106 into a collection tray.

Figure 14C:
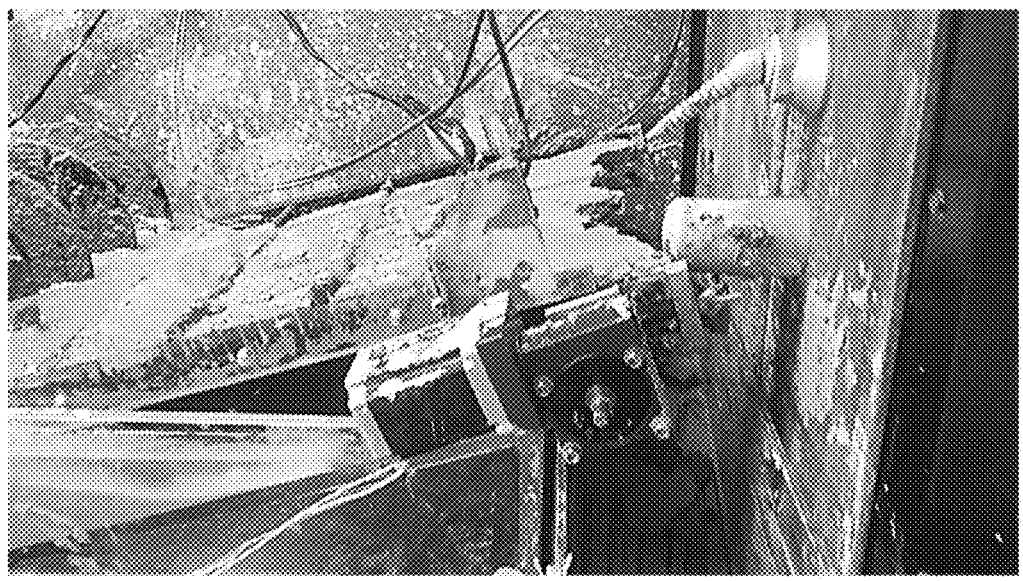

At beginning of the experiment, the separation container 306 was filled with initial clay of about 10 wt % solids, the conveying belt 1106 was moving under a controlled speed, and a constant electric potential was provided by DC power supply 321. A frequency generator or variable speed drive can be used to drive the stepper motor and control the belt speed. Initially, the floating cathode 109fc was lifted or elevated above the clay cake 1109, and the distance between two electrodes 109 in the cake dewatering zone 1103b was larger than the distance between two electrodes 109 in the cake formation zone 1103a. Thus, the clay cake 1109 was not in contact with the floating cathode 109fc. After the conveying belt 1106 was fully covered by the clay cake 1109, the floating cathode 109fc was released, and allowed to float on clay cake 1109, making the maximum contacting area between clay cake 1109 and the floating cathode 109fc as shown in FIG. 14B. Screws or pins holding the floating cathode 109fc above the clay cake 1109 can be released to allow it to float on the clay cake 1109. After the system achieved steady-state, the produced clay cake 1109 was discharged from the end of the conveying belt 1106 and collected in a collection tray as shown in FIG. 14C.

The total mass of thickened clay was measured and the average solids content and/or wet clay production rate were calculated for a defined length of time under steady state operation. Through the operation process, the total current and potential was recorded with the time interval of 30 minutes. Supernatant water samples were collected from the center of the cake formation zone 1103a every one hour. The turbidity and pH values were measured immediately when the water sample was collected, and again after one day of in cell free settling by gravity.

Figure 15A:
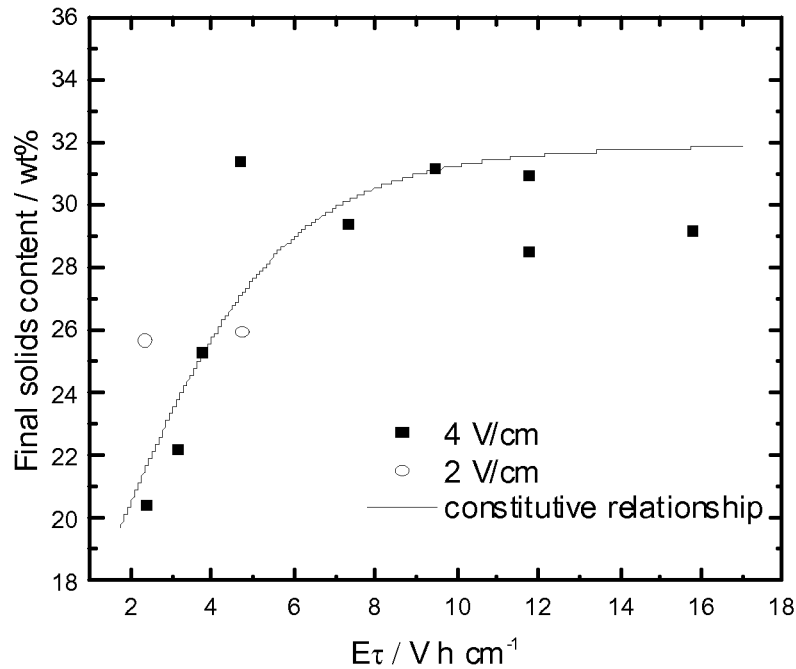
FIGS. 15A-15B, 16A-16D and 17A-17C are plots of test results of the CEKD system of FIGS. 14A through 14C in accordance with various embodiments of the present disclosure.
Figure 15B:
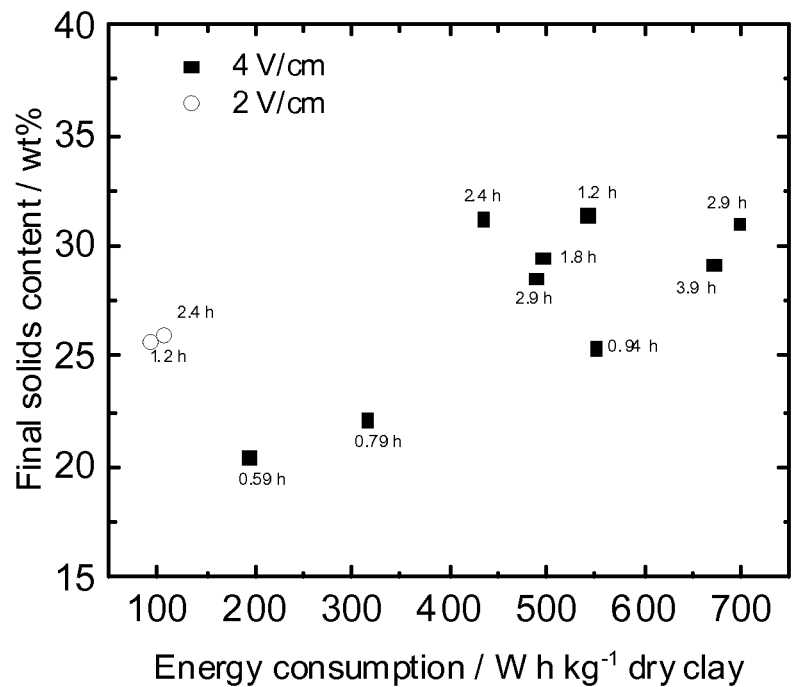

The performance of the fully-continuous CEKD system 1100 was evaluated by measuring the quality of supernatant water, the final solids content of the thickened clay, and the power and energy consumption during the operation. FIG. 15A shows a plot of the final solids content as a function of $E\tau$ and FIG. 15B shows a plot of the final solids content as a function of energy consumption with the electric field as a parameter. The electrode spacing was 6.2 cm. As can be seen, solids content of 25% or more was consistently achieved with the CEKD system 1100.

During testing, the cell potential was provided by an Agilent Technologies N8759A DC Power Supply (ranges: potential 0-100 V, current 0-50 A). The feed flow rate of phosphatic clay suspensions was controlled by a Masterflex Model 77202-60 digital peristaltic pump (Cole-Parmer Instrument Company). The peristaltic pump was also used to evacuate supernatant water. The turbidity of supernatant water was measured using a HACH 2100Q Portable Turbidimeter (range: 0-1000 NTU). The frequency used to control the belt speed was generated by a HEATHKIT Function Generator Model IG-1271. The belt driving force was provided by a SANYO DENKI Model 103H7126-5740 stepper motor and Ondrives PF30-60NM Worm wheel gearbox with a ratio of 60:1.

Supernatant Turbidity.

Figure 16A:
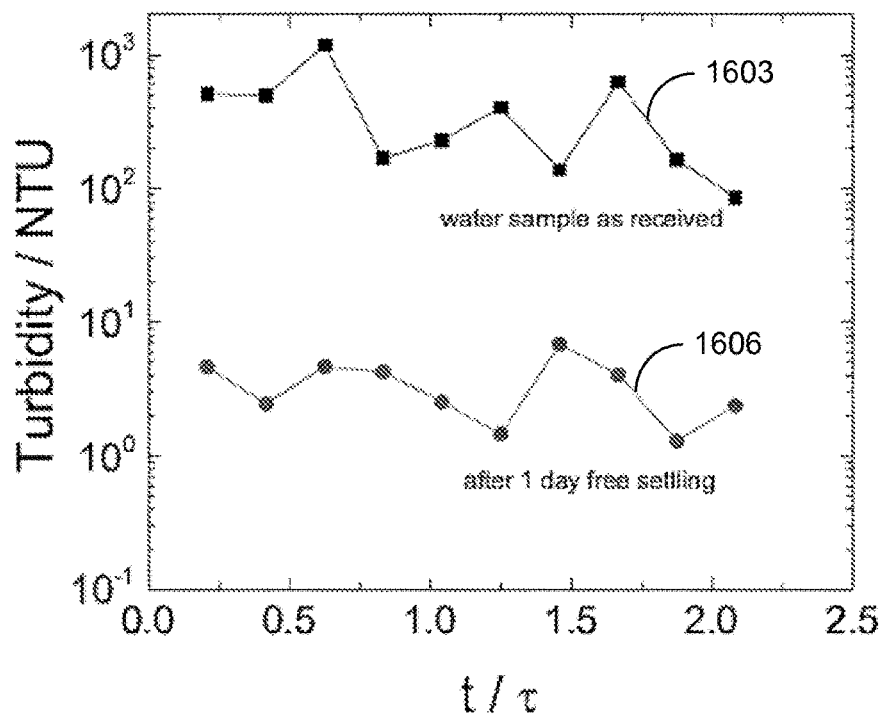

Since the turbidity of the supernatant water was very similar for the experiments under the different operation parameters, the experimental results obtained with an electric field of 4 V/cm and a residence time of 2.4 hours (with a belt speed of 0.5 m/h) is used here to illustrate the turbidity of supernatant water generated from the CEKD system 1100. Referring to FIG. 16A, shown is a plot illustrating an example of the change in supernatant turbidity in the fully continuous system 1100 as a function of elapsed time, given as $t/\tau$, where $\tau$ is residence time calculated by the total length of electrode divided by belt speed. Curve 1603 represents the measured turbidity immediately after the water sample was collected, and curve 1606 represents the supernatant turbidity after one day of free settling. The residence time was 2.4 hours and the electrode spacing was 6.2 cm.

The supernatant water turbidity was relatively stable during the operation. The turbidity was between 100 and 1000 NTU when measured immediately after the sample water was collected (curve 1603), and dropped dramatically after one day of free settling in the cell (curve 1606), reaching a value as low as 1 NTU. The electric field likely separated most of the clay particles from the suspension, but the bubbles generated by the electrochemical reactions brought some particles to the upper layer that were mixed with the supernatant water. These particles were mainly composed of calcite which has a bigger diameter than clay particles, and settled very quickly by gravity. Thus, the supernatant with the high turbidity caused by the coarse particles was easily clarified by free settling.

Figure 16B:
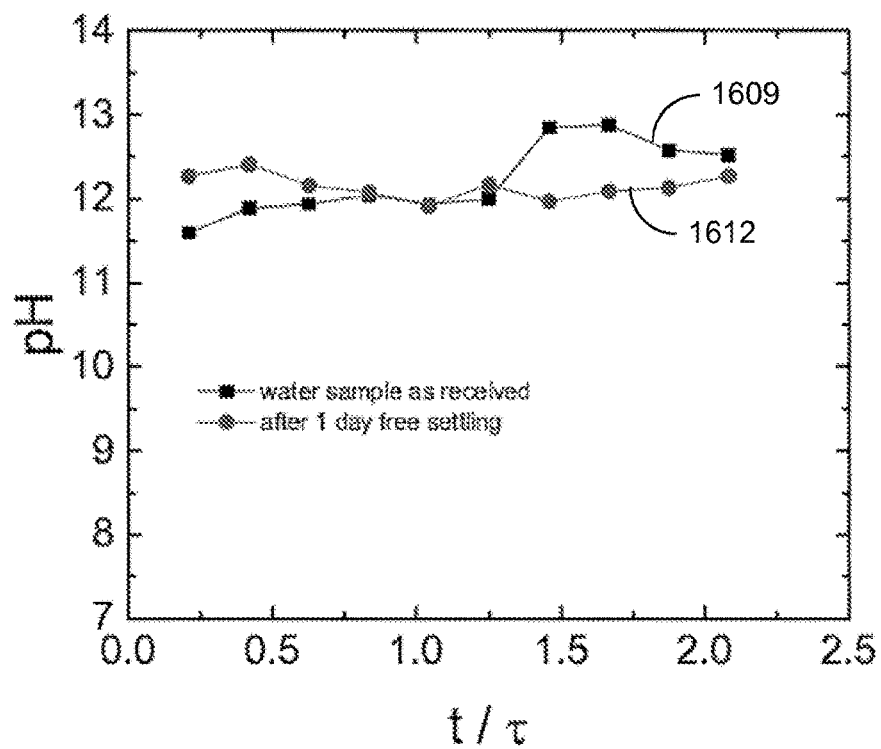

The corresponding pH value of the supernatant water samples is presented in FIG. 16B as a function of scaled elapsed time. The supernatant pH varied from 11.5 to 13 during the operation due to the products of electrochemical reaction given by $2H_2O+2e^- \rightarrow H_2+2OH^-$. The pH remained around 12 after one day free settling. Under fully continuous operation, the entire system 1100 is in dynamic balance. Although the supernatant turbidity decreases and pH increases as a general trend, the measured value could be very different from one location to another, indicating that the position of the clear water region was changed during the operation. The current method of supernatant water collection was used to show the capability of generating supernatant clear water with the fully-continuous CEKD system 1100.

Figure 16C:
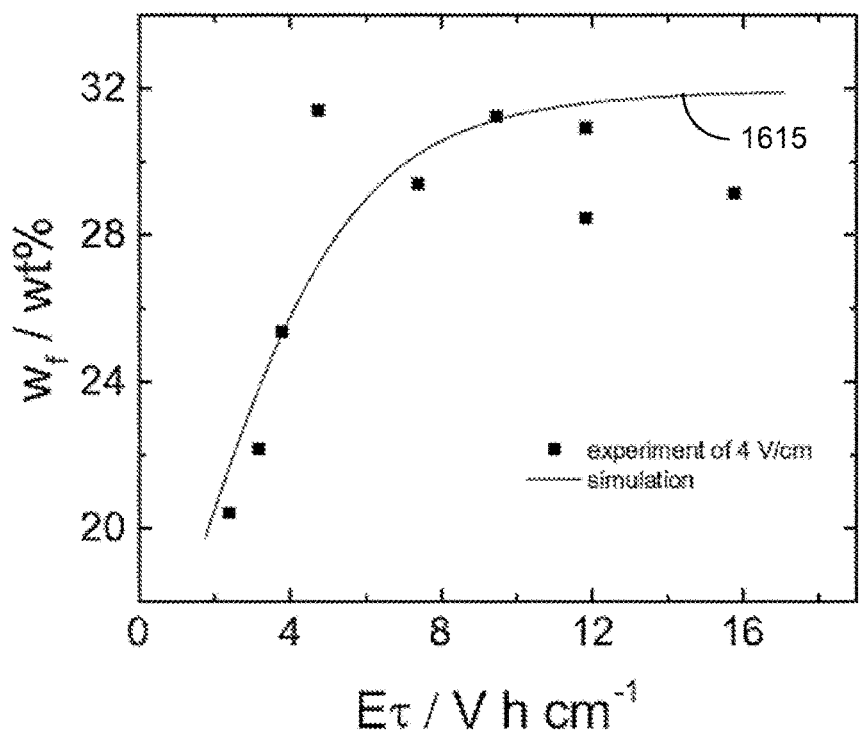

Final solids content. A series of experiments with electrode spacing of 6.2 cm and electric field of 4 V/cm were conducted with a residence time ranging from 0.59 hour to 2.4 hours (a belt speed from 0.5 m/h to 2 m/h). Referring to FIG. 16C, shown is a plot of an example of the final solids content as a function of $E\tau$. The scattered points represent the experimental results and the solid line 1615 represents the simulation result obtained from:

$$w_f = [(aE\tau+c)^{-n}+b^{-n}]^{-1/n} \qquad \text{EQN. 2}$$

where a=3.5, b=32, c=14, n=5, the applied electric field is E in V/cm, and $\tau=L/v_{belt}$ with L representing the effective length of the electrode (the length of the cathode under water) and $v_{belt}$ represents the speed of the conveyor belt 1106. For $\tau$ smaller than 1.2 hours, the final solids content increased with the increase of $E\tau$, from 20 wt % to 32 wt %. The final solids content reached the plateau with $\tau$ larger than 1.2 hours.

At the region where $\tau$ is larger than 3 hours, the final solids content appeared to decrease. The simulation curve 1615 is in good agreement with experimental results, with the exception of $\tau$ greater than 3 hours. With a 4 V/cm electric field and a very slow belt speed, a build-up of solids was observed at the transition between the horizontal cake formation zone 1103a and an angled cake dewatering zone 1103b. The higher-solids content clay was blocked at the transition between the two zones, while clay with lower solids content moved through the transition and was collected. Thus, the average final solids content was underestimated. The reduced solids content may be attributed to the mechanical design instead of the principle of electrokinetic dewatering, and the final solids content from experiments with observed blocking issues (τ greater than 3 hours) are not considered in the following discussion.

Figure 16D:
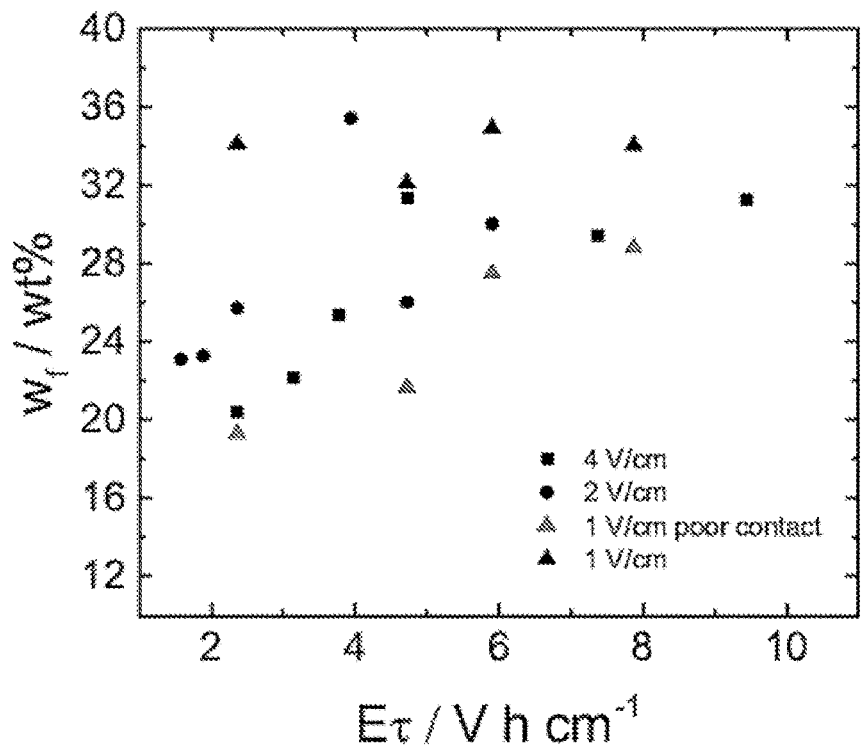

In order to explore the influence of the applied electric field on the final solids content, experiments were conducted for electric fields of 1 V/cm and 2 V/cm. The reduced electric field was achieved by reducing the cell potential and keeping the same electrode spacing in the horizontal cake formation zone 1103a. The electrode spacing in the angled cake dewatering zone 1103b was equal to the clay cake thickness, which is always controlled by the CEKD system 1100 itself. FIG. 16D shows the final solids content as a function of ET with electric fields of 1 V/cm, 2 V/cm, and 4 V/cm. In a few experiments at 1 V/cm, the floating cathode 109fc in the angled cake dewatering zone 1103b did not properly contact the clay cake. These results are labeled as "1 V/cm poor contact" in FIG. 16D. In those experiments, the effective electrokinetic dewatering area was reduced due to the poor contact, and the produced clay had lower solids content. As shown in FIG. 16D, the experiments with an electric field of 1 V/cm produced the clay with a final solids content up to 35 wt %, and the experiments with electric field of 4 V/cm produced the clay with the final solids content only about 32 wt %, given a long enough time. This result suggests that the applied electric field of 1 V/cm is high enough for the fully-continuous system 1100.

Energy Consumption.

The power consumption in the fully-continuous experiments can be given by $$P_{req} = V_{cell} I,$$ EQN. 3 where $P_{req}$ is power consumption (W), $V_{cell}$ is the cell potential (V), and I is the current (A). In the field of clay dewatering, the energy consumption could be evaluated by the energy consumption per unit mass of removed water $E_{req,w}$, which can be expressed as:

$$E_{req,w} = P_{req}/Q_{m,w},$$ EQN. 4 where $E_{req,w}$ is the energy consumption per kg of water removed (Wh/kg$_{H2O}$), $P_{req}$ is the power consumption (W), and $Q_{m,w}$ is the effluent mass flow rate of supernatant water (kg/h). The energy consumption per unit mass of produced dry solids is given by $$E_{req,s} = P_{req}/Q_{m,s},$$ EQN. 5 where $E_{req,s}$ is the energy consumption per kg of dry clay produced (Wh/kg$_{solids}$) and $Q_{m,s}$ is the mass production rate of dry clay (kg/h).

The effluent mass flow rate of supernatant water can be calculated from the materials balance:

$$w_f Q_{m,f} = w_{in}(Q_{m,w} + Q_{m,f}),$$ EQN. 6 which can be expressed as:

$$Q_{m,w} = Q_{m,f}\left(\frac{w_f}{w_{in}} - 1\right),$$ EQN. 7 where $w_{in}$ is the initial solids content of clay suspension, $w_f$ is the final solids content of the thickened clay, and $Q_{m,f}$ is the mass production rate of the thickened wet clay. The production rate of dry clay can be calculated from:

$$Q_{m,s} = w_f Q_{m,f}.$$ EQN. 8

Figure 17A:
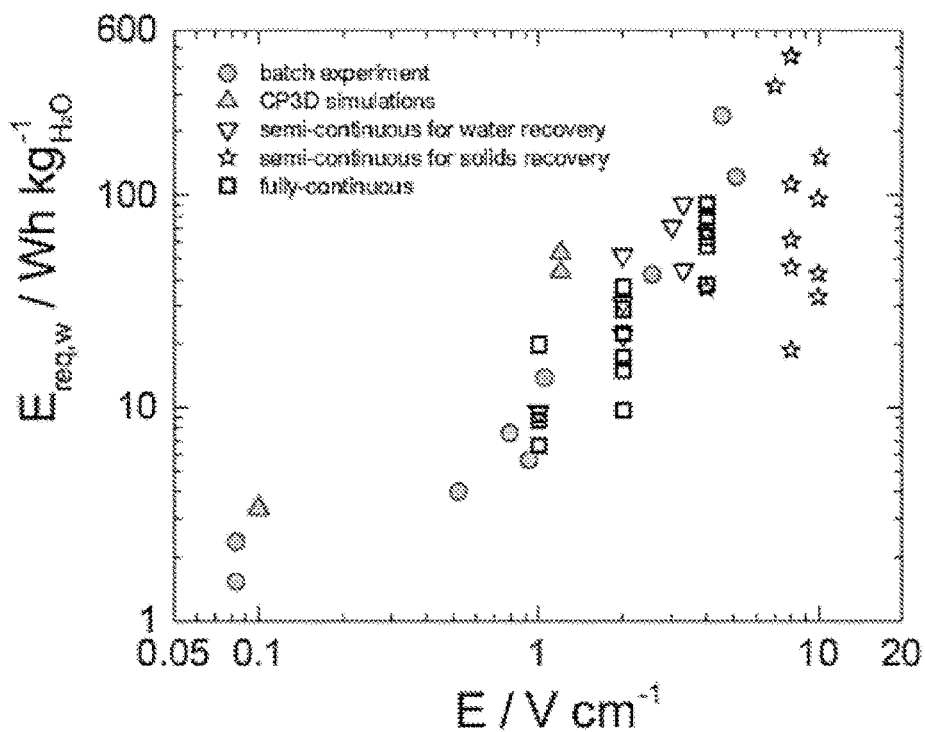

Referring to FIG. 17A, shown are examples of the energy consumption per kg of removed water as a function of the applied electric field for experiments ranging from batch to the fully-continuous system 1100. The squares represent the fully-continuous experimental results under various operation conditions with electric fields of 1 V/cm, 2 V/cm, and 4 V/cm. The results show that, in the fully-continuous experiments, an increase in the applied electric field increased the energy consumption. Under the same electric field conditions, the fully-continuous operation had the lowest energy cost as compared to other experiments.

Figure 17B:
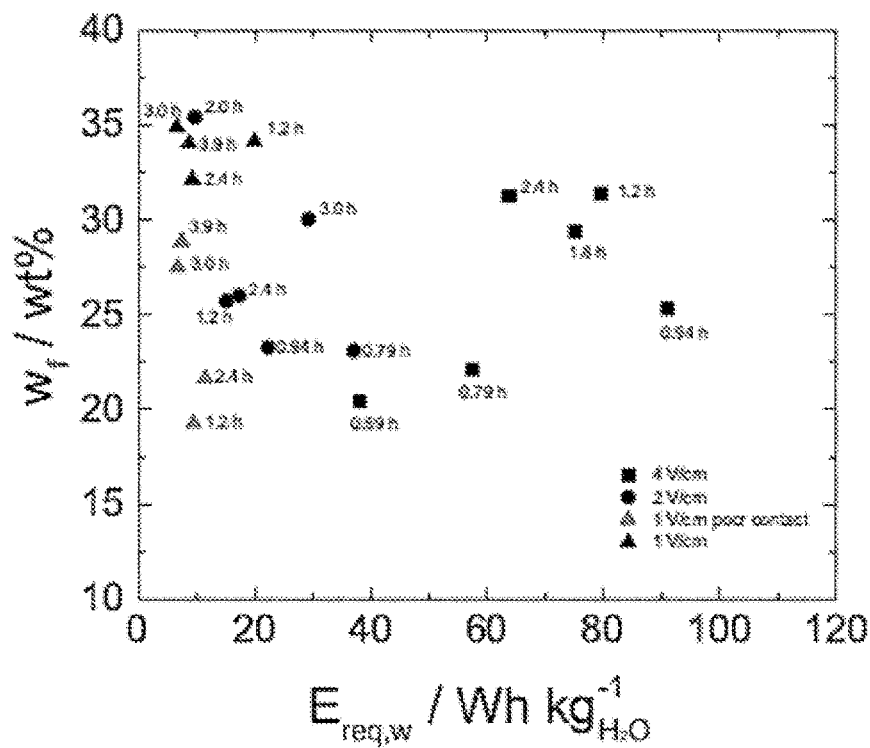
Figure 17C:
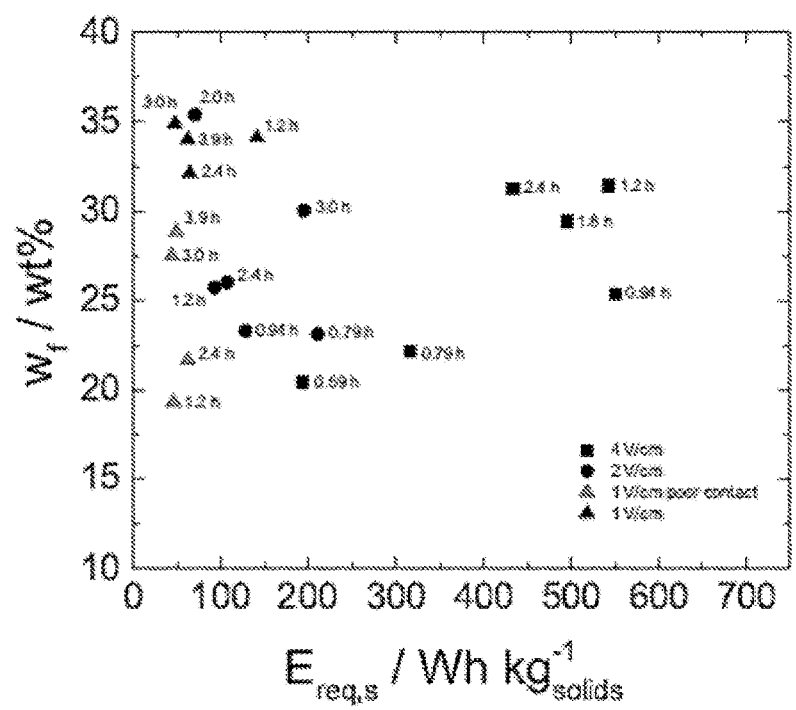

FIGS. 17B and 17C illustrate the final solids content as a function of energy consumption with electric field as a parameter. In FIG. 17B the energy consumption was evaluated by mass of water removed and in FIG. 17C the energy consumption was evaluated by mass of dry clay produced. The corresponding residence time is labeled for each point. The applied electric field varied from 1 V/cm to 4 V/cm, and T varied from 0.59 hour to 3.9 hours. As shown in FIGS. 17B and 17C, the lower electric field is favorable for fully continuous operation. With an electric field of 1 V/cm and a residence time of 3.0 hours, the solids content $w_f$ reached 35 wt % with the energy cost $E_{req,w}$ smaller than 10 Wh/kg$_{H2O}$. As the electric field increased to 4 V/cm, the energy of at least 63 Wh/kg$_{H2O}$ was consumed to achieve the final solids content of 32 wt %. The experiments with 2 V/cm had a performance between the experiments at 1 V/cm and 4 V/cm. The experiments with the poor contact cathode reduced the final solids content, but the energy consumption was not reduced.

The CEKD system 1100 was designed and constructed, and the performance of fully continuous operation was evaluated by measuring the turbidity of supernatant water and the final solids content of thickened clay. A stream of low turbidity (10 NTU after settled) supernatant water was continuously generated, and the thickened clay with the solids content up to 35 wt % was continuously produced. Even with a smaller electric field, the CEKD system 1100 produced higher solids content while consuming less energy.

Cake Formation Zone and Cake Dewatering Zone.

Figure 18A:
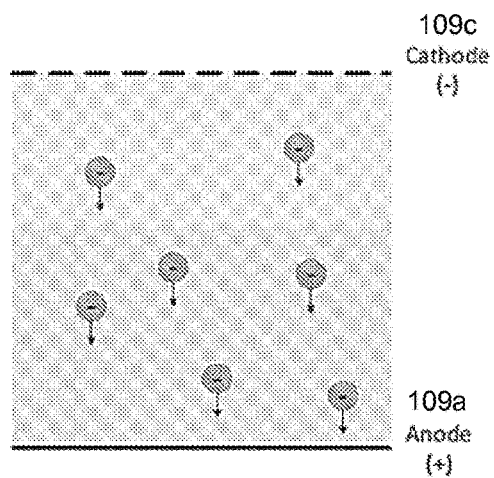
FIGS. 18A and 18B are graphical representations illustrating the electrokinetic effects in a cake formation zone and a cake dewatering zone of the CEKD system in accordance with various embodiments of the present disclosure.

In order to explain the good performance using a small electric field under fully continuous operation and to provide guidance for future improvement, the mechanism of the fully continuous system was investigated. The CEKD system 1100 of FIGS. 11A and 11B comprises a cake formation zone 1103a and a cake dewatering zone 1103b with a transition region at the wheels 1124 that facilitate the change in angle between the two zones. The cake formation zone 1103a is the horizontal zone, fed by the initial clay slurry with the solids content of 10 wt %. Influenced by the applied electric field, the clay particles migrate to the anode 109a (at the bottom) and accumulate on the slowly moving conveyor belt 1106, as shown in FIG. 18A. The thickness of the clay cake increases with time. Under the optimum operation condition, the clay cake builds up and fills the space between the cathode 109c and anode 109a at the end of the cake formation zone 1103a, with the solids content high enough to maintain the solid state, and a thickness small enough to be able to move past the wheels. In the cake formation zone 1103a, the electrokinetic separation is mainly in the form of electrophoresis, represented by the movement of solids in the suspension.

Figure 18B:
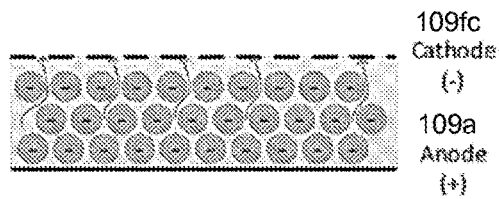

As the clay cake passes the wheels 1124 and moves to the cake dewatering zone 1103b, where the extra water is extracted as shown in FIG. 18B and flows back to the tank and the clay cake is exposed in air. The floating cathode 109fc is placed loosely on the clay cake to maximize the contact area between cathode 109fc and clay, and fixed on the frame along the direction of belt motion. In the cake dewatering zone 1103b, the supernatant water is extracted from the porous structure of clay cake, and moved to the cathode 109*fc*. The movement of water in the porous clay cake can be described by the phenomenon of electroosmosis. The clay dewatering zone 1103*b* is like a power squeezer which effectively squeezes the water from the clay cake.

Figure 19A:
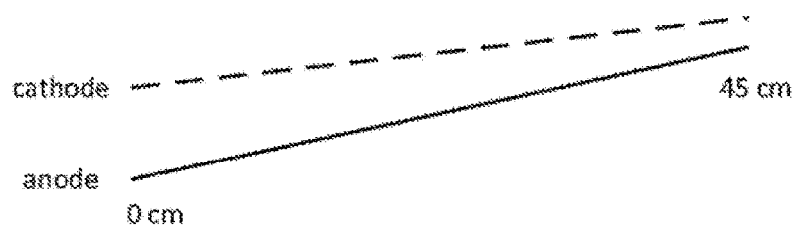
FIGS. 19A through 19C illustrate the electric field and solids content as functions of position along electrodes in the cake dewatering zone of the CEKD system in accordance with various embodiments of the present disclosure.

The electric field in the cake formation zone 1103*a* differs from the electric field in cake dewatering zone 1103*b*. The whole CEKD system 1100 is powered by a constant DC voltage $V_{cell}$, and the potential is equal for both cathodes 109*c* and 109*fc* in the cake formation zone 1103*a* and the cake dewatering zone 1103*b*, as well as anode 109*a*. The distance d between cathode 109*c* and anode 109*a* in cake formation zone 1103*a* is fixed, and the electric field is defined by $V_{cell}/d$, which is maintained at a constant value during operation. The electrode distance in the cake dewatering zone 1103*b* is equal to the thickness of clay cake $\delta(x)$, and $\delta(x)$ is a function of location x. The electric field in the cake dewatering zone 1103*b* is represented by $V_{cell}/\delta(x)$. Because the cake thickness decreases with the increase of solids content, $\delta(x)$ decreases along the belt moving direction, as illustrated in FIG. 19A. In the experiments, the electric field of 1 V/cm, 2 V/cm, and 4 V/cm represent the electric field in the cake formation zone 1103*a*. In the cake dewatering zone 1103*b*, the electric field increases as a result of the decreased electrode spacing. This is controlled by the CEKD system 1100 itself. If a thin layer of clay cake is formed in cake formation zone 1103*a* due to a low electric field, the electrode spacing in cake dewatering zone 1103*b* will be small, the electric field in cake dewatering zone 1103*b* will be large, and a clay cake with the high solids content will be produced. This explains that the 1 V/cm experiments produced higher solids content $w_f$ as compared to experiments using 2 V/cm and 4 V/cm.

A local measurement of clay thickness and solids content was conducted on clay dewatering zone 1103*b* to show the variation of electric field along the belt moving direction. As shown in FIG. 19A, the left edge of anode 109*a* is defined to have a position at 0 cm, and the total length of electrode is 45 cm. Seven points were selected along the anode 109*a*, at the position of 10 cm, 14 cm, 21 cm, 27 cm, 32 cm, 39 cm, and 45 cm. The experiment was conducted under an applied electric field of 1 V/cm, electrode spacing of 6.2 cm, and residence time of 1.2 hours. At each sampling point, the average clay thickness was measured, and the average solids content was determined.

Figure 19B:
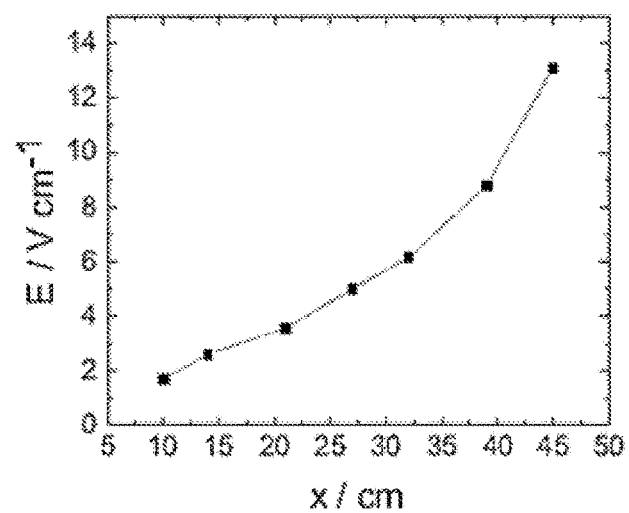
Figure 19C:
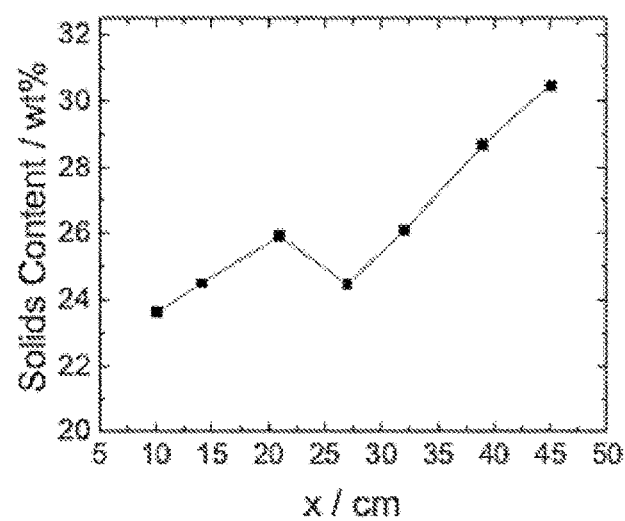

The electric field and solids content are represented in FIGS. 19B and 19C, respectively, as functions of position. The position is represented by x, in unit of cm, and the value of x from 0 cm to 10 cm represents the transition region at the wheels 1124. There is no sampling point between 0 cm to 10 cm because it is very difficult to collect a sample, and even if collected, the result is not reliable due to the existence of the wheels 1124. At x=10 cm, the electric field was 2 V/cm, twice that of the electric field in cake formation zone 1103*a*. At the end of cake dewatering zone 1103*b*, the electric field is increased to 13 V/cm, which is 13 times of the electric field in cake formation zone 1103*a*. The dramatic increase of electric field explains the result shown in FIG. 19C, where the solids content increased from 23 wt % to 31 wt % in the cake dewatering zone 1103*b*.

In view of the analysis of the cake formation zone 1103*a* and the cake dewatering zone 1103*b*, the optimization of fully continuous operation can be considered to be a balance between the two regions 1103. The cake formation zone 1103*a* initiates the formation of clay cake and should be long enough to form the thickened clay cake, yet short enough to avoid wasting energy. The cake dewatering zone 1103*b* is the second part of the CEKD system 1100, where the dramatically increased electric field extensively squeezes the water from the clay cake. The final solids content $w_f$ of the thickened clay is controlled by the combination of cake formation zone 1103*a* and the dewatering zone 1103*b*.

Economic Assessment.

An economic assessment for on-site implementation was conducted based on the results obtained from semi-continuous and fully-continuous testing and compared to the simulation results obtained by McKinney and Orazem in "Electrokinetic Dewatering of Phosphatic Clay Settling Areas: Numerical Simulation and Economic Assessment" (*Minerals & Metallurgical Processing*, 28 (2011) pp. 71-76), which is hereby incorporated by reference in its entirety. The results are shown in the table of FIG. 20. McKinney and Orazem evaluated the power and energy consumption of electrokinetic dewatering based on the batch operation for a one square mile clay settling pond at the Mosaic Four Corners Mine in central Florida. The predicted energy consumption was 41.3 Wh/$kg_{H2O}$ for the increase of solids content from 10 wt % to 25 wt % under an applied electric field of 1.2 V/cm. A power consumption of 44,000 MW was predicted for the treatment of the entire clay settling pond.

The on-site evaluation with semi-continuous and fully continuous operation was conducted assuming a continuous treatment of the output clay slurry from Mosaic Four Corners Mine, which is 130,000 GPM phosphatic clay slurry with solids content of 2 wt %. The influent flow rate was converted to 26,000 GPM for clay slurry with solids content of 10 wt %. The applied electric field, final solids content, residence time, and thickened clay production rate were obtained from the best experimental result. The power usage was scaled up by the influent flow rate. The best result from the semi-continuous operation was obtained using an electric field of 10 V/cm. The on-site evaluation indicates that an energy consumption of 42.7 Wh/$kg_{H2O}$ and a power consumption of 141 MW would produce 26 wt % clay.

In the fully continuous operation, a lower electric field can be used, and the experiment with an electric field of 1 V/cm produced thickened clay with a solids content of 35 wt % and an energy consumption of about 6.6 Wh/$kg_{H2O}$. The corresponding on-site implementation indicates that an input power of 29 MW would be needed for the treatment of 26,000 GPM (10 wt %) phosphatic clay slurry. When the electric field was increased to 4 V/cm, a final solids content of only 31 wt % was obtained even with higher energy consumption. As compared to the results from the semi-continuous operation, the electric field needed to achieve a final solids content of 26 wt % or higher, was greatly reduced by the fully-continuous operation, and the energy consumption was reduced from 42.7 Wh/kg to $H_2O$ 6.6 Wh/$kg_{H2O}$. Compared with the batch experiment, the fully-continuous prototype increased the final solids from 25 wt % to 35 wt %, reduced the energy consumption from 41.3 Wh/$kg_{H2O}$ to 6.6 Wh/$kg_{H2O}$, and dramatically reduced the power consumption from 44,000 MW to 29 MW.

Although the fully continuous experiment achieved final solids content of 35 wt % with a residence time of 3 hours and an energy consumption of 6.6 Wh/$kg_{H2O}$, with an applied electric field of only 1 V/cm, the performance of the fully-continuous system 1100 can be improved. In the cake dewatering zone 1103*b*, the cathode 109*fc* floats on the clay cake. If the clay thickness were uniformly distributed, the cathode 109*fc* would be in good contact with the clay everywhere on the surface. When the clay cake is not generated uniformly, the contact can be poor at the thin part of the clay cake. Without contacting the cathode 109*fc*, the electrokinetic dewatering is reduced or did not happen, and the average final solids content of clay can be greatly reduced.

The influence of non-uniform clay thickness was observed in all fully continuous experiments, and was especially obvious in the experiments of low final solids content. FIG. 21 illustrates the variability of the solids content under an electric field of 2 V/cm and 1 V/cm with poor contact. The open symbols represent the average final solids content and the filled symbols represent the maximum local value in the same experiment. In the 2 V/cm experiment, the local solids content was 41 wt %, and the average final solids content was only about 35 wt %. In the 1 V/cm experiment, the local solids content was 32 wt %, and the average final solids content was only about 29 wt %. Under optimal operation, the average final solids content should be the same as the maximum local value.

Although the low-turbidity supernatant water was produced from the fully-continuous prototype, collection can still be difficult. The water can be removed by aspiration from the surface. The water produced by this method can contain a mixture of supernatant and solids entrained by gas bubbles rising from the anode 109a, thereby increasing the water turbidity. A non-uniform distribution of the surface clarified water may also be a concern. Because the clear water region moved during the operation, the water collection location can be moved to improve the extracted water. When the water was not collected in the best location, the resulting turbidity measurement did not reflect the best value achievable by the system. A weir can be added at the wall of the tank to create a space that can allow settling of the suspended solids before removing the supernatant water from the tank.

Intermittent power supply may also increase the efficiency of the CEKD system 1100. Since the effective time of the applied electric field is reduced for intermittent power experiments compared to the DC power experiments, the total applied energy can be reduced by applying the intermittent power. However, the intermittent power did not necessarily save energy. Experiments were carried out on a semi-continuous system to evaluate the effect, and it was found that the final solids content of the experiments with intermittent power was very close to the final solids content of the experiments with the DC power. If the residence time T for the intermittent experiment is defined as the effective residence time for the clay exposed in the electric field, the experimental results shift but still follow the constitutive relationship, with the corresponding energy consumption being similar to the DC power experiments.

The performance of the fully-continuous CEKD system 1100 illustrates the economic feasibility of electrokinetic dewatering for industrial applications. The energy consumption may be further reduced with improvement to the operational parameters and the mechanical design. In the fully-continuous system 1100, a rigid mesh cathode 109fc in the cake dewatering zone 1103b produced non-uniform solids content if the thickness of the clay cake was not uniform in the cake formation zone 1103a. The average final solids content was thereby reduced due to the rigid mesh cathode. An alternative material for the cathode can possess flexibility, while still maintaining high hydrogen evolution kinetics to produce a small surface over potential at the electrode surface. This flexible cathode can be corrosion resistant and inexpensive. For example, the alternate cathode material may be a carbon cloth.

The wheels located at the transition between the cake formation zone 1103a and the cake dewatering zone 1103b provide a simple and efficient design for the change in angle. However, in some operation conditions where high solids content is achieved, the clay cake can be blocked between adjacent wheels resulting in a reduction in clay production. In some embodiments, the wheels may be removed and a guider inserted on the sides of the frame to guide the direction of belt movement. As previously discussed, addition of a weir around the circumference of the tank can allow for settling while blocking entrained large particles, prior to collection of the clarified water.

The constant DC voltage may be replaced by an intermittent voltage source to reduce the Faradic current associated with the electrochemical reactions. The electrokinetic separation would occur from the effects of both a charging current and a Faradic current. By reducing the Faradic current, a reduction in the energy for water electrolysis may result. The ion concentration near the electrode can also be reduced, and the energy consumption may be decreased by the associated increased resistivity of the suspension.

In some embodiments, the cake formation zone 1103a and the cake dewatering zone 1103b may be separated to avoid having the water extracted from the clay cake being returned to the separation chamber 306. For example, a transition zone may be provided to allow the thickened clay to be moved from the separation chamber 306 prior to continuing the water extraction in the cake dewatering zone 1103b. The conveyor belt 1106 can continuously extend through the three zones or the thickened clay can be transferred between belts in one or more of the sections.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for continuous electrokinetic dewatering, comprising:
    a cake formation zone including a first anode and a first cathode each extending horizontally across a first portion of a separation chamber, the first anode and the first cathode energized to establish a first electric field between the first anode and the first cathode;
    a cake dewatering zone including a second anode and a second cathode each extending at an upward angle across a second portion of the separation chamber, the second anode and the second cathode energized to establish a second electric field between the second anode and the second cathode;

an inlet configured to supply a dilute feed suspension comprising solids suspended in water to the cake formation zone; and a conveying belt extending horizontally between the first anode and the first cathode and extending at the upward angle between the second anode and the second cathode, where the first electric field forms a cake on the conveying belt by consolidating the solids away from the first cathode, and the second electric field dewaters the cake on the conveying belt.

2. The system of claim 1, wherein the conveying belt discharges the cake from the separation chamber after dewatering.

3. The system of claim 1, wherein the inlet comprises an inlet nozzle configured to distribute the dilute feed suspension between the first anode and the first cathode.

4. The system of claim 1, further comprising a pump that supplies the dilute feed suspension to the inlet.

5. The system of claim 4, further comprising a supply tank that supplies the dilute feed suspension to the pump, the supply tank configured to stir the dilute feed suspension.

6. The system of claim 1, wherein the dilute feed suspension is supplied at a constant flow rate.

7. The system of claim 1, wherein the first cathode is horizontally positioned below and adjacent to a surface of the dilute feed suspension in the separation chamber, the first cathode substantially parallel to the first anode.

8. The system of claim 7, wherein the first cathode comprises a dimensionally stable mesh electrode.

9. The system of claim 7, wherein the first anode is horizontally positioned below and substantially parallel to an upper portion of the conveying belt in the cake formation zone.

10. The system of claim 9, wherein the first anode comprises a plate electrode.

11. The system of claim 1 wherein the second anode is positioned at the upward angle below and substantially parallel to an upper portion of the conveying belt in the cake dewatering zone.

12. The system of claim 11, wherein the first anode is horizontally positioned below and substantially parallel to an upper portion of the conveying belt in the cake formation zone.

13. The system of claim 11, wherein the second cathode is positioned at the upward angle above and substantially parallel to the upper portion of the conveying belt.

14. The system of claim 13, wherein the first cathode comprises a dimensionally stable mesh electrode.

15. The system of claim 13, wherein the second cathode is configured to float on the cake.

16. The system of claim 1, further comprising a power supply configured to energize the first anode and the first cathode.

17. The system of claim 16, wherein the power supply is further configured to energize the second anode and the second cathode.

* * * * *